United States Patent

Tsuda et al.

[11] Patent Number: 5,936,688
[45] Date of Patent: Aug. 10, 1999

[54] REFLECTOR, METHOD FOR FABRICATING THE SAME AND REFLECTIVE LIQUID CRYSTAL DISPLAY DEVICE INCORPORATING THE SAME

[75] Inventors: Kazuhiko Tsuda, Tenri; Masako Nakamura, Yamatokoriyama; Akiyoshi Fujii, Ikoma-gun; Mariko Ban, Nara; Yasuhisa Itoh; Kozo Nakamura, both of Tenri; Naofumi Kimura, Nabari, all of Japan

[73] Assignee: Sharp Kabushiki Kaisha, Osaka, Japan

[21] Appl. No.: 08/806,438

[22] Filed: Feb. 26, 1997

[30] Foreign Application Priority Data

Feb. 27, 1996 [JP] Japan .................................. 8-039772
Nov. 20, 1996 [JP] Japan .................................. 8-308548

[51] Int. Cl.⁶ .......................... G02F 1/1335; G02F 1/13; C09K 19/60
[52] U.S. Cl. ......................... 349/113; 349/107; 349/180; 349/165
[58] Field of Search ..................... 349/113, 106, 349/180, 107

[56] References Cited

U.S. PATENT DOCUMENTS

| | | | |
|---|---|---|---|
| 4,632,514 | 12/1986 | Ogawa et al. | 349/107 |
| 4,929,060 | 5/1990 | Sugimoto et al. | 349/113 |
| 5,408,345 | 4/1995 | Mitsui et al. | 359/59 |
| 5,500,750 | 3/1996 | Kanbe et al. | 349/113 |
| 5,526,149 | 6/1996 | Kanbe et al. | 349/113 |
| 5,610,741 | 3/1997 | Kimura | 349/113 |
| 5,691,791 | 11/1997 | Nakamura et al. | 349/113 |
| 5,714,247 | 2/1998 | Kuo et al. | 349/113 |

FOREIGN PATENT DOCUMENTS 6-75238   3/1994   Japan .

*Primary Examiner*—William L. Sikes
*Assistant Examiner*—Toan Ton
*Attorney, Agent, or Firm*—David G. Conlin; George W. Neuner

[57] ABSTRACT

A reflector includes a substrate, a plurality of convex/concave portions formed on the substrate, and a thin reflective film formed over the convex/concave portions. When light is incident upon the reflector from a certain direction, an intensity of reflected light in a viewing angle range of about −45° to +45° with respect to a regular reflection direction of the incident light is about 60% or more of an intensity of light which is incident upon a standard white plate from a direction inclined by about 30° from a direction normal to the plate and is reflected to the direction normal to the plate.

10 Claims, 22 Drawing Sheets

Cone corresponding to wide viewing angle range 201
202
204a

Cone corresponding to narrow viewing angle range 201
202
204b

PRIOR ART

REFLECTOR, METHOD FOR FABRICATING THE SAME AND REFLECTIVE LIQUID CRYSTAL DISPLAY DEVICE INCORPORATING THE SAME

BACKGROUND OF THE INVENTION

1. Field of the Invention

The present invention relates to a reflector incorporated in a reflective liquid crystal display device with no backlight, a method for fabricating the same, and a reflective liquid crystal display device incorporating the same.

2. Description of the Related Art

In recent years, liquid crystal display devices have been increasingly used in personal computers, TVs, word processors, video cameras, etc. There has been demands for further improvements of these appliances such as miniaturization, power-saving, cost reduction, etc. In an attempt to meet these demands, reflective liquid crystal display devices having no backlight which display images by reflecting ambient light incident thereupon have been developed.

In order to achieve bright display with a reflective liquid crystal display device having no backlight, it is important to efficiently utilize ambient light. Accordingly, a reflector incorporated in such a reflective liquid crystal display device plays a very important roll. It is thus necessary to design a reflector having the most suitable reflection characteristic and which efficiently utilizes ambient light incident upon the device from every direction, and to develop a technique for fabricating such a reflector with high accuracy and high reproducibility.

Japanese Laid-Open Patent Publication No 6-75238 discloses a reflective liquid crystal display device. The reflector incorporated in the liquid crystal display device includes convex/concave portions formed of a photosensitive resin and a film thinner than the convex/concave portions deposited over the convex/concave portions, thereby smoothing the surface of the reflector including the convex/concave portions. The reflector is used in the liquid crystal display device in combination with a guest-host mode (referred to as simply a "GH" mode hereinafter).

FIGS. 20G to 20L are top views each illustrating one of the fabrication steps for a conventional reflector 106, whereas FIGS. 20A to 20F are each cross-sectional views taken along the line A to A' in FIGS. 20G to 20L, respectively. In FIG. 20L, dashed lines represent contour lines of the reflector 106.

First, as shown in FIGS. 20A and 20G, a photosensitive resin is deposited on a glass substrate 101 so as to form a photosensitive resin layer 102a. Then, a photomask 103 including circular regions is placed over the glass substrate 101 as shown in FIGS. 20B and 20H. Then, the substrate is exposed to light and developed, thus forming cylindrical protrusions 102b on the substrate 101 as shown in FIGS. 20C and 20I. Then, the entire substrate is subjected to a heat treatment so that the protrusions 102b are adequately melted and form smooth convex portions 102c as shown in FIGS. 20D and 20J. Then, a photosensitive resin is again deposited over the entire surface of the substrate 101 including the smooth convex portions 102c so as to form a photosensitive resin layer 104 thinner than the layer 102a, thereby obtaining a surface including smooth convex/concave portions as shown in FIGS. 20E and 20K. Finally, a thin metal film is deposited on the layer 104 so as to form a reflection film 105 as shown in FIGS. 20F and 20L. A conventional reflector 106 is thus fabricated.

As shown in FIG. 20L, the reflector 106 fabricated by the conventional fabrication process includes a lot of flat regions. The optical characteristic of the reflector 106 is such that, although no interference occurs, a large portion of light incident upon the reflector 106 is reflected to a direction of regular reflection. For example, when light is incident upon the conventional reflector 106 from a direction perpendicular thereto, a large portion of the light is reflected to the direction perpendicular to the reflector 106 which corresponds to the direction of the regular reflection. Accordingly, there is only a very limited range of directions in which high-intensity reflected light is obtained. In other words, with such a conventional reflector 106, it is not possible to obtain high-intensity reflected light in a wide range of directions. Therefore, when such a reflector is used in a reflective liquid crystal display device performing multi-color display, the brightness of display would not be sufficient for practical use.

Conventional liquid crystal display devices are produced without sufficient consideration for compatibility among the liquid crystal display mode, the color filter, and the reflector. Therefore, there are undesirable situations such as where the display is bright but with low contrast; the contrast is high but with low brightness; or the brightness and the contrast are both high but with a slow response rate, a high threshold voltage, or non-uniformity in display due to inferior orientation of the liquid crystal molecules.

In order to ensure the display quality required for practical use, the application of such a conventional reflective liquid crystal display device is limited to a black-and-white display or, at the best, a 4-color display. Thus, the growing demand for multi-color displays with the growing variety of information has not been satisfied.

In order to realize a multi-color display which can be practically used, the compatibility among the reflector, the liquid crystal display mode, the color filter, and other factors need to be considered while improving the reflection characteristic of the reflector. Unlike a transmission type liquid crystal display device provided with a backlight, the reflective liquid crystal display device greatly depends upon ambient light. Thus, it is necessary to suitably design the optical characteristic and the convex/concave structure of the reflector, appropriately select a display mode from a number of display modes to best match the optical characteristic of the reflector, optimize various parameters of the display mode, and appropriately design a color filter. However, it has not been possible to realize a multi-color display even with these factors being optimized since the reflection characteristics of the reflector are not sufficient.

SUMMARY OF THE INVENTION

According to one aspect of this invention, a reflector includes a substrate, a plurality of convex/concave portions formed on the substrate, and a thin reflective film formed over the convex/concave portions. When light is incident upon the reflector at a first incident angle with respect to a normal direction thereof, an intensity of reflected light in a viewing angle range of about −45° to +45° with respect to a regular reflection direction of the incident light is about 60% or more of a reference intensity, where the reference intensity is an intensity of light which is incident upon a standard white plate at a second incident angle with respect to a normal direction thereof and is reflected to the normal direction.

In one embodiment of the invention, each of the convex/concave portions at least partially includes a continuous curved surface. A total area of the portions of the substrate whose inclination at a surface of the reflector is less than 2° accounts for about 40% or less with respect to a total area of the substrate.

In another embodiment of the invention, the convex/concave portions are formed of a photosensitive resin.

In still another embodiment of the invention, the convex/concave portions are formed of an inorganic oxide and a photosensitive resin.

In still another embodiment of the invention, the convex/concave portions are formed of minute particles and a photosensitive resin.

In still another embodiment of the invention, the convex/concave portions are formed by forming a plurality of cylindrical depressions in a photosensitive resin layer formed on the substrate and heating the plurality of cylindrical depressions.

According to another aspect of this invention, a method for fabricating a reflector including a substrate, a plurality of convex/concave portions formed on the substrate, and a thin reflective film formed over the convex/concave portions, includes the steps of: performing a photolithography process and a heat-treatment process to form the convex/concave portions for a plurality of rounds; and forming the thin reflective film over the convex/concave portions.

In one embodiment of the invention, a shape of the convex/concave portions formed through a single round of the photolithography process is constant.

In another embodiment of the invention, a shape of the convex/concave portions formed in one round of the photolithography process is different from a shape of the convex/concave portions formed in another round of the photolithography process.

In still another embodiment of the invention, as a photosensitive resin used in the plurality of rounds of photolithography processes, a negative photosensitive resin is first used and a positive photosensitive resin is subsequently used.

According to still another aspect of this invention, a method for fabricating a reflector including a substrate, convex/concave portions formed on the substrate, and a thin reflective film formed over the convex/concave portions, includes the steps of: performing a photolithography process and a heat treatment to form the convex/concave portions; and forming the thin reflective film over the convex/concave portions. The method further includes the steps of: forming an oxide on the substrate; and etching the oxide.

According to still another aspect of this invention, a method for fabricating a reflector including a substrate, convex/concave portions formed on the substrate, and a thin reflective film formed over the convex/concave portions, includes the steps of: performing a photolithography process and a heat treatment so as to form the convex/concave portions; and forming the thin reflective film over the convex/concave portions, wherein the method further comprises the step of applying an organic insulating resin mixed with minute particles onto the substrate.

According to still another aspect of the invention, a method for fabricating a reflector including a substrate, a plurality of convex/concave portions formed on the substrate, and a thin reflective film formed over the convex/concave portions, includes the steps of: forming a photosensitive resin layer on the substrate; performing a photolithography process to form a plurality of cylindrical depressions in the photosensitive resin layer; heating the plurality of cylindrical depressions to form the convex/concave portions on the substrate; and forming the thin reflective film over the convex/concave portions.

According to still another aspect of this invention, a reflective liquid crystal display device includes a reflector mentioned above.

In one embodiment of the invention, the reflective liquid crystal display device further includes a substrate and a liquid crystal layer interposed between the substrate and the reflector. The liquid crystal layer includes a guest-host type liquid crystal material.

In another embodiment of the invention: a birefringence ($\Delta n$) of the liquid crystal material is about 0.15 or less; a dielectric constant anisotropy ($\Delta \epsilon$) of the liquid crystal material satisfies an expression: $4<\Delta\epsilon<12$; a twist angle of the liquid crystal material is set to be within a range of about 180° to 360°; and a thickness of a cell constituted by the substrate, the reflector and the liquid crystal layer is within a range of about 3 to 10 $\mu$m.

In still another embodiment of the invention, the reflective liquid crystal display device further includes a color filter including colored portions of three different colors, wherein a difference in thickness between adjacent colored portions is about 0.3 $\mu$m or less.

Thus, the invention described herein makes possible the advantages of (1) providing a reflector having a reflection characteristic most suitable for a reflective liquid crystal display device or the like incorporating the reflector, thereby efficiently utilizing ambient light without interference; (2) providing a method for fabricating the same; and (3) providing a reliable reflective liquid crystal display device having excellent display quality which allows for a multi-color display by optimizing the compatibility among the reflector, the liquid crystal layer, and the color filter.

These and other advantages of the present invention will become apparent to those skilled in the art upon reading and understanding the following detailed description with reference to the accompanying figures.

BRIEF DESCRIPTION OF THE DRAWINGS

FIGS. 6F to 6J are top views each illustrating one of the fabrication steps whereas FIGS. 6A to 6E are cross-sectional views taken along the line A to A' in FIGS. 6F to 6J, respectively.

FIGS. 9G to 9L are top views each illustrating one of the fabrication steps whereas FIGS. 9A to 9F are cross-sectional views taken along the line A to A' in FIGS. 9G to 9L, respectively.

FIGS. 20G to 20L are top views each illustrating one of the fabrication steps whereas FIGS. 20A to 20F are cross-sectional views taken along the line A to A' in FIGS. 20G to 20L, respectively.

FIGS. 21F to 21J are top views each illustrating one of the fabrication steps whereas FIGS. 21A to 21E are cross-sectional views taken along the line A to A' in FIGS. 21F to 21J, respectively.

DESCRIPTION OF THE PREFERRED EMBODIMENTS

(EXAMPLE 1)

Hereinafter, a reflector and a method for fabricating the same according to Example 1 of the present invention will be described.

The method for fabricating the reflector according to Example 1 of the present invention will be described now with reference to FIGS. 1A to 1M illustrating the fabrication process of the reflector.

Figure 1A:
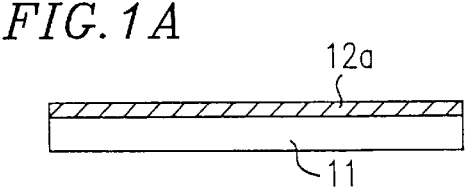
FIGS. 1A to 1M illustrate the fabrication process of a reflector according to Example 1 of the present invention.
Figure 1B:
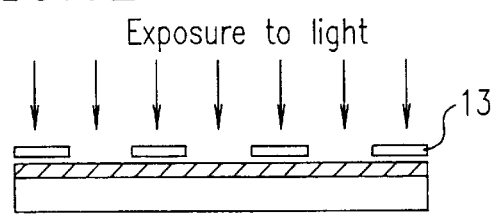
Figure 1C:
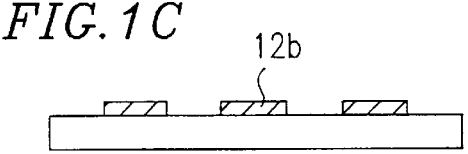

First, as shown in FIG. 1A, a photosensitive resin (e.g., "OFPR-800": TOKYO OHKA KOGYO CO., LTD.) is spin-coated on one surface of a transparent substrate, such as a glass substrate (e.g., "7059": CORNING INC.) 11 at, preferably, about 500 to 3000 rpm so as to form a photosensitive resin layer 12a. In the present example, "OFPR-800" (TOKYO OHKA KOGYO CO., LTD.) as the photosensitive resin is applied onto "7059" (CORNING INC.) as the substrate about 1.1 mm thick for about 30 seconds while spinning the glass substrate 11 at about 1000 rpm, thereby forming a photosensitive resin layer 12a to be about 1.2 μm-thick on the glass substrate 11. Then, the substrate is pre-baked for about 30 minutes at about 100° C., after which a photomask 13 having a predetermined pattern is placed over the glass substrate 11 as shown in FIG. 1B. Then, the substrate is exposed to light and developed with a developing solution (e.g., 2.38% of NMD-3: TOKYO OHKA KOGYO CO., LTD.), thus forming minute cylindrical protrusions 12b as shown in FIG. 1C. Hereinafter, the series of steps from the application of a photosensitive resin to the exposure to light is referred to as the "photolithography process".

The photomask 13 used at the step of FIG. 1B for forming the cylindrical protrusions 12b includes a plurality of minute circular light-transmitting regions which are randomly distributed therein. The photomask 13 is designed so that the adjacent protrusions 12b formed in a single photolithography process are spaced apart from one another by an interval of at least about 2 μm, whereby any protrusion 12b is not in contact with adjacent protrusions 12b. Further, the photomask 13 is designed so that the total area of all the protrusions formed through three rounds of photolithography processes accounts for about 80% of the total area of pixel regions.

Figure 1D:
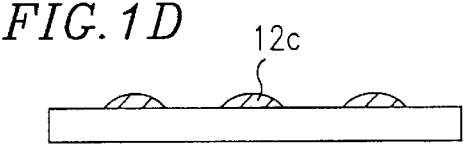
Figure 1E:
Figure 1F:
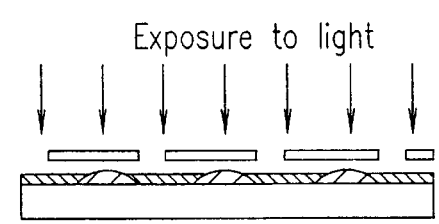
Figure 1G:
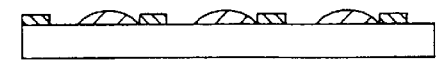
Figure 1H:
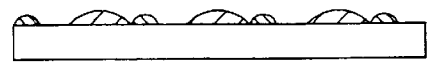
Figure 1I:
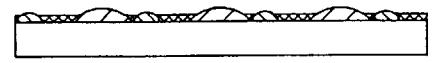
Figure 1J:
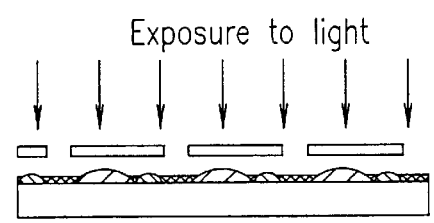
Figure 1K:
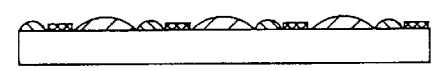
Figure 1L:
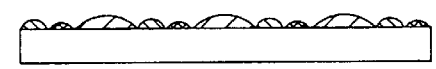

After the following heat treatment process at about 120 to 250° C., the protrusions 12b on the substrate 11 are rounded off, thereby obtaining convex portions 12c, as shown in FIG. 1D, having a smooth surface without any sharp edges thereon. In the present example, the heat treatment is performed at about 180° C. for about 30 minutes. Hereinafter, this step is referred to as the "heat-treatment process".

Then, the series of steps as shown in FIGS. 1A to 1D including the photolithography process and the heat-treatment process is repeated for a plurality of rounds (two more rounds in the present example, as shown in FIGS. 1E to 1H and 1I to 1L).

The conditions in these fabrication steps are shown in Table 1 below for each of the three rounds of the steps.

TABLE 1

|  | Substrate revolution during photosensitive resin application | Duration of photosensitive resin application | Thickness of resultant film | Aperture shape of photomask | Aperture diameter of photomask |
| --- | --- | --- | --- | --- | --- |
| 1st round | 1000 rpm | 30 sec | 0.5 μm | Circle | 20 μm |
| 2nd round | 2000 rpm | 30 sec | 1.2 μm | Circle | 10 μm |
| 3rd round | 3000 rpm | 30 sec | 0.2 μm | Circle | 5 μm |

According to Example 1 of the present invention, the temperature for the heat-treatment process is set to about 180° C. throughout the plurality of rounds. However, when using a polymer with a relatively low cross-linking property, it is preferable to set the heat-treatment temperature lower in a subsequent round than that in a former round for allowing the shape of the convex portions 12c formed in the former round to become more stable.

Figure 1M:
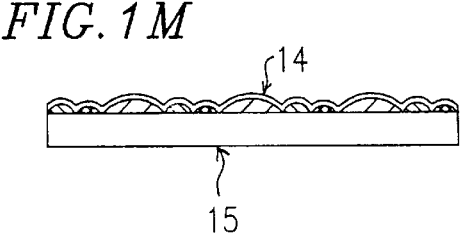

Then, as shown in FIG. 1M, a thin metal film 14 having a light-reflecting property (hereinafter referred to as simply the "reflection film") is formed over the produced convex portions 12c. In the present example, the reflection film 14 is formed by vacuum evaporation of Al. As well as Al, other metals (e.g., Ni, Cr, Ag) which have a high reflectance and can be deposited to be a thin film without difficulty may be used. The reflection film 14 is preferably formed to be about 0.01 to 1.0 μm in thickness.

A reflector 15 of Example 1 is thus obtained through the fabrication process described above.

Figure 2A:
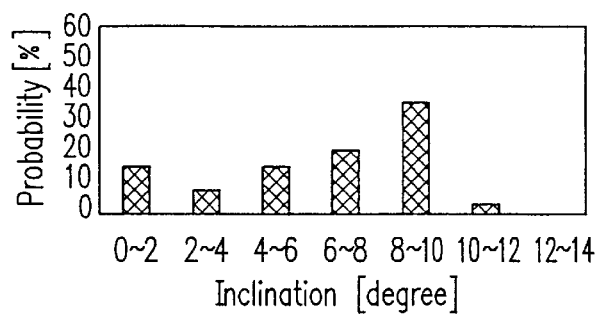
FIG. 2A is a graph showing the inclination distribution of the surface of the reflector of Example 1.

When the reflector 15 is observed, the shape of the convex portion on the surface thereof is a cone-shaped mound of gentle undulation, at least part of which is a continuous curved surface, with the peaks of the convex portions being randomly distributed. Moreover, an inclination distribution of the surface of the reflector 15 is obtained by using an interference microscope. The results for the reflector 15 of Example 1 are shown in a graph of FIG. 2A. As shown in the graph, the total area of regions on the surface of the reflector 15 whose inclination is 0° or greater but less than 2° (hereinafter referred to as a "flat region") accounts for about 17% of the total area of the pixel regions.

Figure 3:
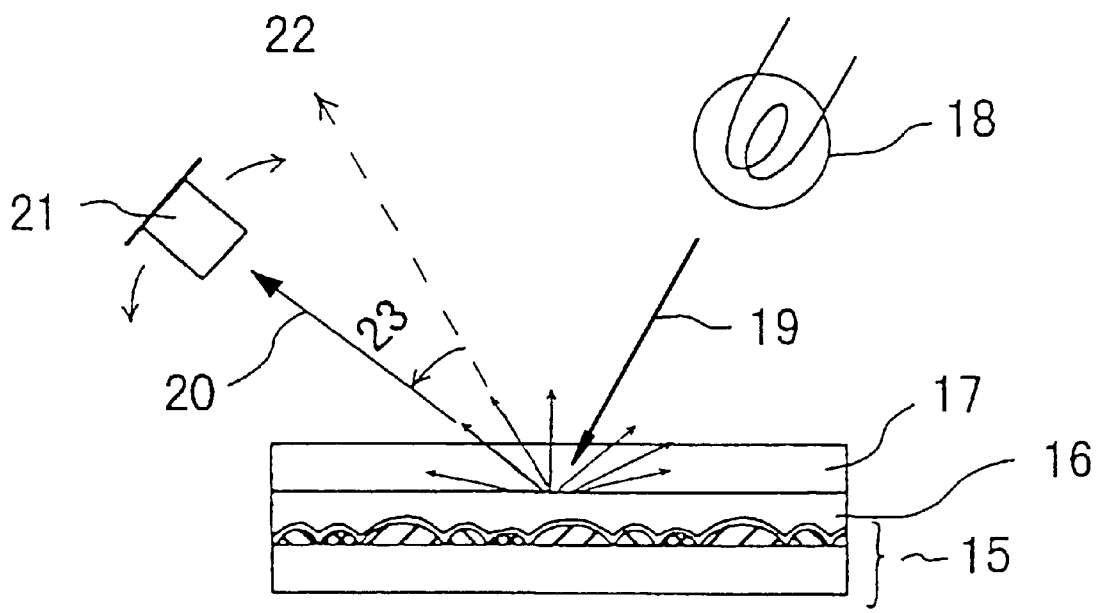
FIG. 3 is a schematic diagram showing the measurement of the reflection characteristic of the reflector.
Figure 4A:
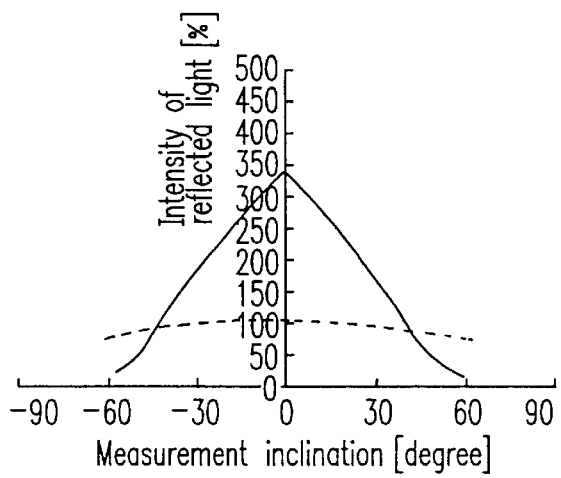
FIG. 4A is a graph showing the reflection characteristic of the reflector of Example 1.

The reflection characteristic of the reflector 15 is measured under a realistic situation where the reflector 15 would be incorporated in an actual liquid crystal display device. FIG. 3 schematically shows how the measurement is, performed, and FIG. 4A shows the results of the measurement for the reflector 15 of Example 1.

In FIG. 3, a UV-curable adhesive is applied onto the surface of the reflector 15 to form an adhesive layer 16 to which a glass substrate (for measurement use) 17 adheres. In order to realize realistic conditions under which a liquid crystal display device would be practically used, a UV-curable adhesive having substantially the same refractive index (about 1.5) as a liquid crystal layer and the glass substrate 17 is used to form the adhesive layer 16. It should be noted that the interface between the adhesive layer 16 and the glass substrate 17 does not affect the results of the measurement. Thus, the reflection characteristic obtained through such a measurement can be considered to be the reflection characteristic at the actual interface between the reflector 15 and a liquid crystal layer.

In the measurement, light 19 emitted from a light source 18 is made incident upon the reflector 15 at a certain angle. Light 20 reflected at the surface of the reflector 15 is detected by a photomultimeter 21, thereby measuring the reflection characteristic of the reflector 15. In particular, the intensity of the reflected light is measured while varying the inclination of the photomultimeter 21 (as indicated by oppositely directed arrows in FIG. 3) with respect to a direction 22 to which the light being incident upon the reflector 15 at the certain angle and reflected by a regular reflection is directed. The inclination of the photomultimeter 21 with respect to the regular reflection direction 22 is the measurement inclination 23 and corresponds to the angle from which a viewer views a reflective liquid crystal display device incorporating the reflector 15 (i.e., the viewing angle of the reflector 15).

Throughout FIGS. 4A to 4E, the x-axis represents the measurement inclination whereas the y-axis represents the measured intensity with respect to a reference intensity in percentage (%). Herein, the measurement inclination is 0° when the photomultimeter 21 is in the regular reflection direction 22.

The reference intensity is obtained in the following manner. First, light is made incident upon a standard white plate (MgO). The angle of the light incident upon the standard white plate with respect to a direction normal to the plate is set to be substantially the same as the angle at which light is incident upon the reflector for which the measurement is performed. Then, the light reflected by the standard white plate is detected by the photomaltimeter 21 which is positioned so as to receive a portion of the light reflected toward the direction normal to the standard white plate. The intensity of the portion of the light detected by the photomaltimeter 21 is used as the reference intensity.

For example, a case where a measurement for a certain reflector is performed by making light incident upon the reflector at an angle of 30° with respect to the normal direction of the reflector is described. In this case, the intensity of the reflected light is measured while varying the position of the photomaltimeter 21 with respect to the regular reflection direction 22 to which a portion of the light is directed by the regular reflection. Thus, measured intensity is obtained. The reference intensity is obtained in a similar manner except for the position of the photomaltimeter 21. More specifically, light is made incident upon the standard white plate at an angle of 30° with respect to the normal direction of the standard white plate. The photomultimeter 21 is positioned toward the normal direction of the standard white plate, and the reference intensity is obtained as an intensity of the light reflected from the standard white plate toward the normal direction. In another case where the measurement for the reflector is performed by making light incident upon the reflector at an angle of, for example, 50°, the incident angle at which light is incident upon the standard white plate is also set to be 50°.

In the measurement of the reflector 15 of the present example, light 19 is made incident upon the reflector 15 at an angle of about 30° with respect to the direction normal to the reflector 15. The measurement result is presented in FIG. 4A. As shown in FIG. 4A, the reflector 15 exhibits highest reflectance at a measurement inclination of about 0°. The intensity of the reflected light exceeds about 60% of the reference intensity throughout a wide range of about −45° to +45° with respect to the regular reflection direction. In particular, the intensity of the reflected light exceeds about 160% in a range of about −30° to +30°. The reflector 15 of Example 1 thus provides bright display in such a wide range of viewing angle while suppressing reflection of light to the regular reflection direction (to which the conventional reflector reflects most of light incident thereupon, thereby excessively increasing the intensity of the reflected light in the direction).

The photosensitive resin material used for the reflector 15 is not limited to the above-mentioned resin material ("OFPR-800": TOKYO OHKA KOGYO CO., LTD.). In fact, it is possible to use any photosensitive resin of either a negative or positive type which can be patterned by using at least a photolithography process. As a possible choice of the material, OMR-83, OMR-850, NNR-20, OFPR-2, OFPR-830, and OFPR-5000 (TOKYO OHKA KOGYO CO., LTD.); TF-20, 1300-27, and 1400-27 (SHIPLEY); Photoneece (TORAY INDUSTRIES, INC.); or RW101 (SEKISUI FINE CHEMICAL CO.); R101, and R633 (NIPPON KAYAKU K.K.) may be used for the reflector 15 of the present invention. Herein, the pattern of the photomask 13 has to be determined to be positive or negative depending upon whether a photosensitive resin to be used is positive or negative.

Although in the present example, a transparent glass substrate is employed as the substrate 11 of the reflector 15, similar effects can also be achieved by using opaque substrates such as an Si substrate. When using an opaque substrate, there is an advantage that circuits (e.g., circuits for driving the liquid crystal display device incorporating the reflector) to be provided on the substrate can be easily integrated.

Moreover, similar effects can be achieved by providing a reflector with a flat surface having more than one region having different refractive indices. In such a case, there are advantages such as improving the patterning of electrodes on the reflector and also improving the orientation of liquid crystal molecules.

(EXAMPLE 2)

Hereinafter, a reflector and a method for fabricating the same according to Example 2 of the present invention will be described.

The method for fabricating the reflector according to Example 2 of the present invention will be described now with reference to FIGS. 5A to 5I illustrating the fabrication process of the reflector.

Figure 5A:
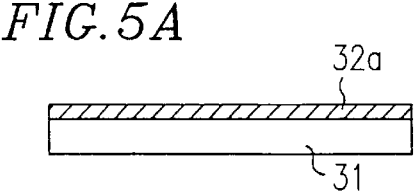
FIGS. 5A to 5I illustrate the fabrication process of a reflector according to Example 2 of the present invention.
Figure 5B:
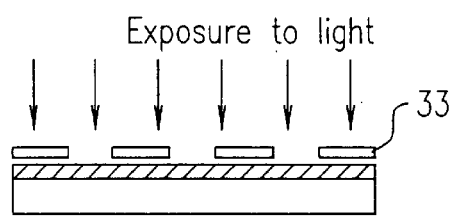
Figure 5C:
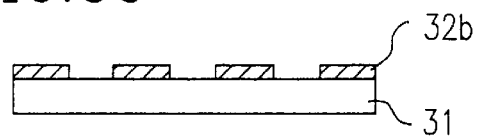

First, as shown in FIG. 5A a negative type photosensitive resin (e.g., "V259PA": NIPPON STEEL CHEMICAL Co., Ltd.) is spin-coated on one surface of a transparent substrate, such as a glass substrate (e.g., "7059": CORNING INC.) 31 at, preferably, about 500 to 3000 rpm so as to form a photosensitive resin layer 32a to be of a desired thickness. In the present example, "V259PA" (NIPPON STEEL CHEMICAL Co., Ltd.) as the photosensitive resin is applied onto "7059" (CORNING INC.) as the substrate about 1.1 mm thick for about 30 seconds while spinning the glass substrate 31 at about 1000 rpm, thereby forming a photosensitive resin layer 32a to be about 1.2 $\mu$m-thick on the glass substrate 31. Then, the substrate is pre-baked for about 30 minutes at about 100° C., after which a photomask 33 having a predetermined pattern is placed over the glass substrate 31 as shown in FIG. 5B. Then, the substrate is exposed to light and developed with a $CaCO_3$ solution (4%), thus forming minute protrusions 32b on regions of the substrate 31 where light is blocked, as shown in FIG. 5C.

Figure 5D:
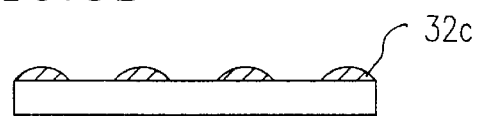

After the following heat treatment process at about 200 to 240° C., the protrusions 32b on the substrate 31 are rounded off, thereby obtaining convex portions 32c, as shown in FIG. 5D, having a smooth surface without any sharp edges thereon. In the present example, the heat treatment is performed at about 220° C. for about 30 minutes.

Figure 5E:
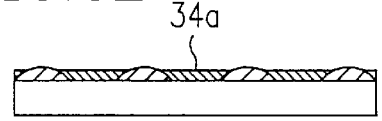

Then, as shown in FIG. 5E, a positive type photosensitive resin is spin-coated over the substrate 31 including the convex portions 32c at, preferably, about 500 to 3000 rpm so as to form a photosensitive resin layer 34a to be of a desired thickness. In the present example, "MFR" (manufactured by JAPAN SYNTHETIC RUBBER CO., LTD.) is employed as the positive type photosensitive resin applied onto the substrate for about 30 seconds while spinning the glass substrate 31 at about 2000 rpm, thereby forming a photosensitive resin layer 34a to be about 0.5 $\mu$m-thick on the glass substrate 31.

Figure 5F:
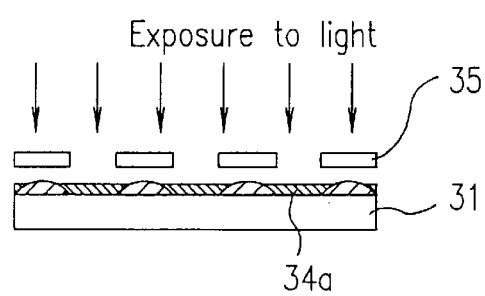

Then, the substrate is pre-baked for about 30 minutes at about 100° C., after which a photomask 35 having a predetermined pattern is placed over the glass substrate 31 as shown in FIG. 5F. Then, the substrate is exposed to light. The photomask 35 is designed so that no light is incident upon the convex portions 32c of the negative type photosensitive resin formed in the photolithography process in the first round. Therefore, the shape of the convex portions 32c is maintained in the second round.

Each of the photomasks 33 and 35 used in the present example for forming the protrusions 32b and 34b includes a plurality of minute circular light-blocking regions which are randomly distributed therein. The photomasks 33 and 35 are designed so that the adjacent protrusions 32b and 34b formed in a single photolithography process are spaced apart from one another by an interval of at least about 2 $\mu$m. Further, the photomasks 33 and 35 are designed so that the total area of all the protrusions formed through two rounds of photolithography processes accounts for about 80% of the total area of pixel regions.

Figure 5G:
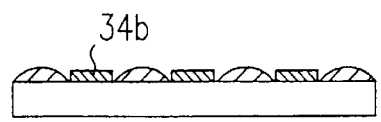

Then, the substrate is developed with a KOH solution (1%), thus forming the minute protrusions 34b on the substrate 31 as shown in FIG. 5G. As described above, by first using a negative type photosensitive resin and then using a positive type photosensitive resin, protrusions of a stable shape can be formed. The reason is that light to be incident upon the convex portions 32c formed in the first round is blocked by the photomask 35 in the exposure step in the second round.

Figure 5H:
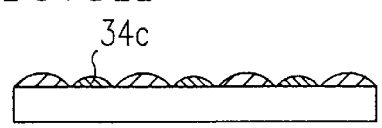

The protrusions 34b on the substrate 31 are rounded off by the following heat treatment process at about 140 to 240° C., and are cured to be convex portions 34c, as shown in FIG. 5H, having a smooth surface without any sharp edges thereon. In the present example, the heat treatment is performed at about 180° C. for about 10 minutes.

Figure 5I:
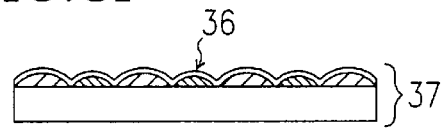
Figure 6A:
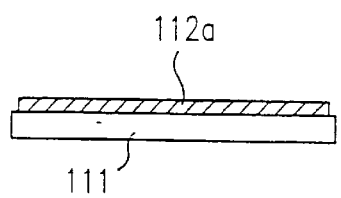
FIGS. 6A to 6J illustrate the fabrication process of a reflector according to Comparative Example 2, where
Figure 6B:
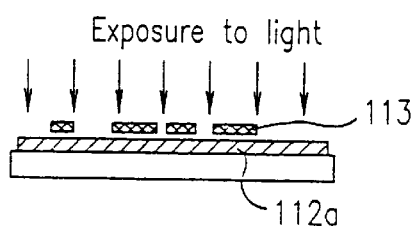
Figure 6C:
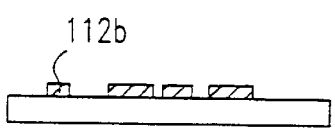
Figure 6D:
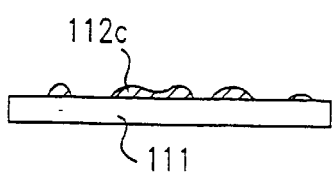
Figure 6E:
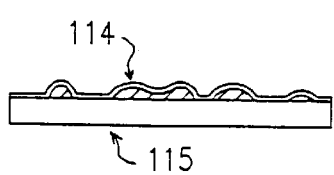
Figure 6F:
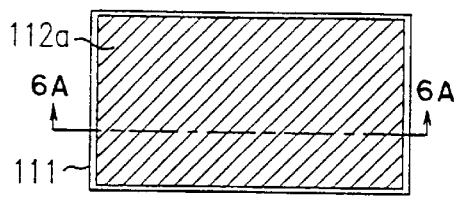
Figure 6G:
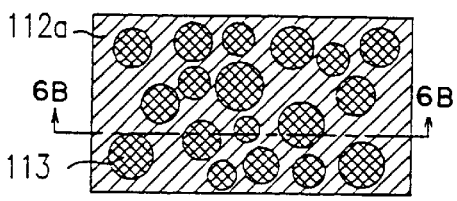
Figure 6H:
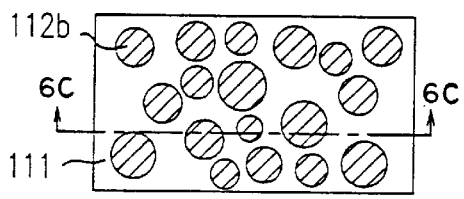
Figure 6I:
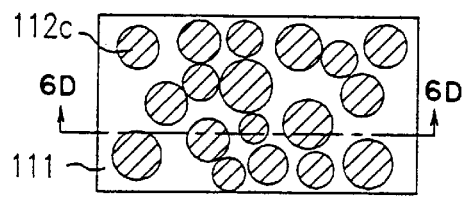
Figure 6J:
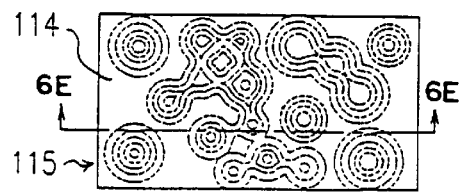

After these steps, as shown in FIG. 5I, a reflection film 36 is formed over the produced convex portions 32c and 34c on the substrate 31. In the present example, the reflection film 36 is formed by vacuum evaporation of Al. As well as Al, other metals (e.g., Ai, Ni, Cr, Ag) which have a high reflectance and can be deposited to be a thin film without difficulty may be used to form the reflection film 36. The reflection film 36 is preferably formed to be about 0.01 to 1.0 $\mu$m in thickness.

A reflector 37 of Example 2 is thus obtained through the fabrication process described above.

Figure 2B:
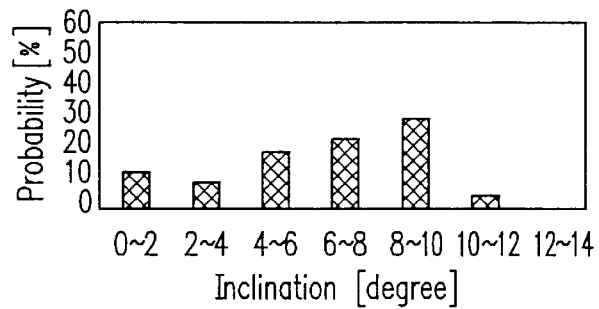
FIG. 2B is a graph showing the inclination distribution of the surface of a reflector of Example 2.

When the reflector 37 is observed, the shape of the convex portion on the surface thereof is a cone-shaped mound of gentle undulation, at least part of which is a continuous curved surface, with the peaks of the convex portions being randomly distributed. The diameter of the convex portion 32c is about 20 µm, and the diameter of the convex portion 34c is about 10 µm. Moreover, an inclination distribution of the surface of the reflector 37 is obtained by using an interference microscope. The results for the reflector 37 of Example 2 are shown in a graph of FIG. 2B. After the convex portions 32c and 34c are formed accurately corresponding to the patterns of the photomasks 33 and 35, the total area of the flat regions (having an inclination 0° or greater but less than 2°) on the surface of the reflector 37 accounts for about 20% of the total area of the pixel regions.

Figure 4B:
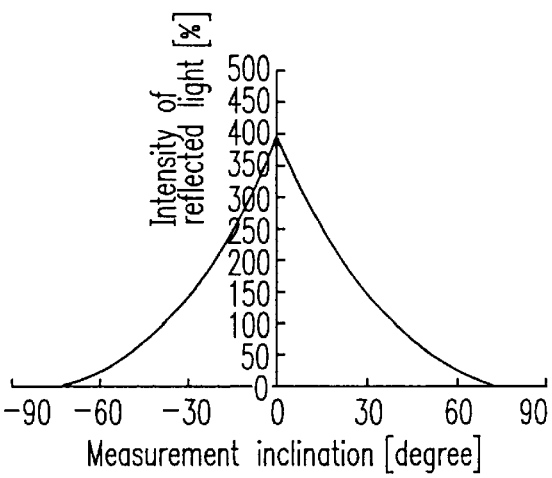
FIG. 4B is a graph showing the reflection characteristic of the reflector of Example 2.

FIG. 4B shows the results of the measurement for the reflection characteristic of the reflector 37 of Example 2. The measurement is performed as in Example 1. As shown in FIG. 4B, the intensity of the reflected light exceeds about 60% of the reference intensity throughout a wide range of about −45° to +45° with respect to the regular reflection direction. Especially, the intensity of the reflected light exceeds about 150% of the reference intensity in a range of about −30° to +30° with respect to the regular reflection direction. The reflector 37 of Example 2 thus provides bright display in such a wide range of the viewing angle. In other words, reflection of light to the regular reflection direction (to which the conventional reflector reflects most of light incident thereupon, thereby excessively increasing the intensity of the reflected light in the direction) is suppressed.

(Comparative Example 1)

Hereinafter, a reflector and a method for fabricating the same according to Comparative Example 1 will be described.

The method for fabricating the reflector according to Comparative Example 1 will be described now with reference to FIGS. 21A to 21J, where FIGS. 21F to 21J are top views each illustrating one of the fabrication steps for a reflector 125, whereas FIGS. 21A to 21E are each cross-sectional view taken along the line A to A' in FIGS. 21F to 21J, respectively.

Figure 21A:
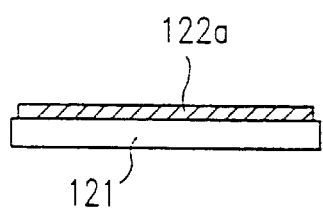
FIGS. 21A to 21J illustrate the fabrication process of a reflector according to Comparative Example 1, where
Figure 21F:
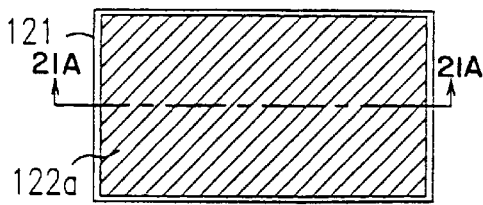
Figure 21B:
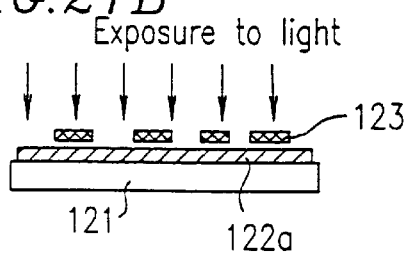
Figure 21G:
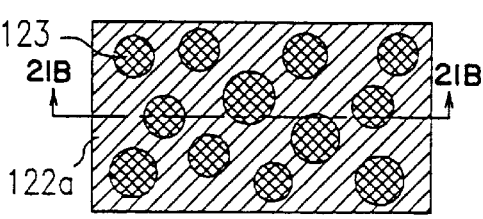
Figure 21C:
Figure 21H:
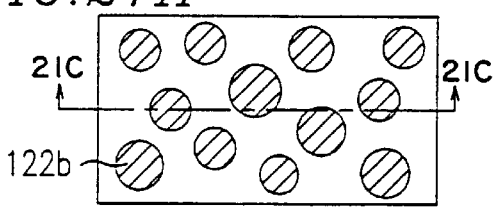

First, as shown in FIGS. 21A and 21F, a photosensitive resin is spin-coated on one surface of a transparent substrate such as a glass substrate 121 at, preferably, about 500 to 3000 rpm so as to form a photosensitive resin layer 122a to be of a desired thickness. In the present example, "OFPR-800" (TOKYO OHKA KOGYO CO., LTD.) as the photosensitive resin is applied onto "7059" (CORNING INC.) as the substrate about 1.1 mm thick for about 30 seconds while spinning the glass substrate 121 at about 1000 rpm, thereby forming a photosensitive resin layer 122a to be about 1.2 µm-thick on the glass substrate 121. Then, the substrate is pre-baked for about 30 minutes at about 100° C., after which a photomask 123 having a predetermined pattern is placed over the glass substrate 121 as shown in FIGS. 21B and 21G. Then, the substrate is exposed to light and developed, thus forming minute cylindrical protrusions 122b on the substrate 121 as shown in FIGS. 21C and 21H.

The photomask 123 used for forming the cylindrical protrusions 122b at the step of FIGS. 21B and 21G includes a plurality of minute circular light-blocking regions which are randomly distributed therein. The photomask 123 is designed so that the adjacent protrusions 122b formed in a single photolithography process are spaced apart from one another by an interval of at least about 2 µm, whereby any protrusion 122b is not joined with adjacent protrusions 122b. Further, the photomask 123 is designed so that the total area of all the protrusions formed through the photolithography process accounts for about 40% of the total area of the pixel regions.

Figure 21D:
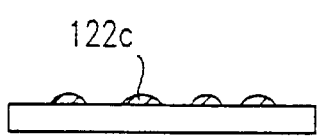
Figure 21I:
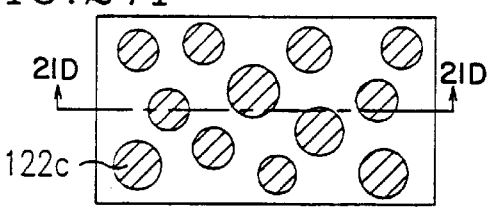

The protrusions 122b on the substrate 121 are rounded off by the following heat treatment process at about 120 to 250° C., and are cured to be convex portions 122c, as shown in FIGS. 21D and 21I, having a smooth surface without any sharp edges thereon. In the present example, the heat treatment is performed at about 180° C. for about 30 minutes.

Figure 21E:
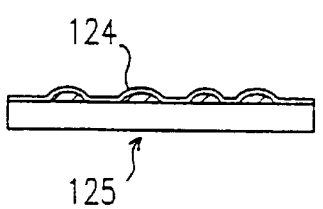
Figure 21J:
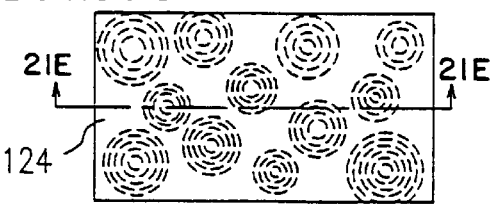

After the steps shown in FIGS. 21E and 21J, a reflection film 124 is formed over the produced convex portions 122c on the substrate 121. In the present example, the reflection film 124 is formed by vacuum evaporation of Al. As well as Al, other metals (e.g., Ai, Ni, Cr, Ag) which have a high reflectance and can be deposited to be a thin film without difficulty may be used to form the reflection film 124. The reflection film 124 is preferably formed to be about 0.01 to 1.0 µm in thickness.

A reflector 125 of Comparative Example 1 is thus obtained through the fabrication process described above.

Figure 4C:
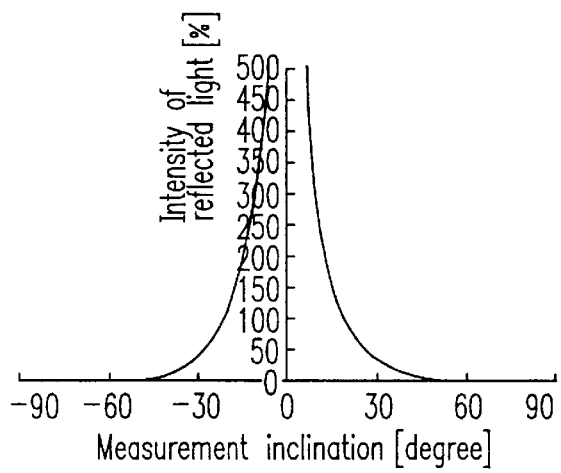
FIG. 4C is a graph showing the reflection characteristic of the reflector of Comparative Example 1.

When the reflector 125 is observed, the shape of the convex portion 122c on the surface thereof is a cone-shaped mound of gentle undulation, at least part of which is a continuous curved surface, with the peaks of the convex portions 122c being randomly distributed. Moreover, an inclination distribution of the surface of the reflector 125 is obtained by using an interference microscope. The results for the reflector 125 of Comparative Example 1 are shown in a graph of FIG. 2C. Furthermore, FIG. 4C shows the results of the measurement for the reflection characteristic of the reflector 125 of Comparative Example 1. The measurement is performed as in Example 1.

Figure 2C:
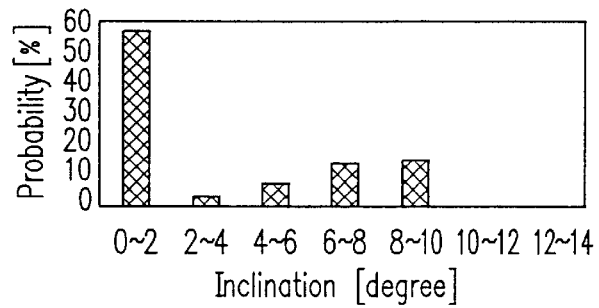
FIG. 2C is a graph showing the inclination distribution of the surface of a reflector of Comparative Example 1.

As shown in FIG. 2C, the total area of the flat regions on the surface of the reflector 125 accounts for about 60% of the total area of the pixel regions.

As shown in FIG. 4C, the reflection characteristic of the reflector 125 is such that the intensity of the reflected light is very high in a range of about −15° to +15° with respect to the regular reflection direction, whereas it rapidly decreases outside this range. In particular, the intensity of the reflected light in the range of about −5° to +5° with respect to the regular reflection direction is extremely high as compared to that at other measurement inclinations.

The reason why a high intensity of reflected light cannot be obtained in a wide range is believed to be the excessively large area of the flat regions, whereby most of light incident thereupon is reflected by a regular reflection.

(Comparative Example 2)

Hereinafter, a reflector and a method for fabricating the same according to Comparative Example 2 will be described.

The method for fabricating the reflector according to Comparative Example 2 will be described now with reference to FIGS. 6A to 6J, where reference numeral 111 denotes a glass substrate; 112a denotes a photosensitive resin; 112b denotes cylindrical protrusions; 112c denotes smooth convex portions; 114 denotes a reflection film; and 115 denotes a reflector. A photomask 113 used to form the cylindrical protrusions 112b includes a plurality of minute circular light-blocking regions which are randomly distributed therein. In the present example, the photomask 113 is designed so that the least interval between the resultant adjacent protrusions 112b is as small as about 0.5 μm, whereby the total area of all the protrusions becomes relatively small with respect to the total area of pixel regions. In particular, the photomask 113 is designed such that the total area of all the protrusions formed in the photolithography process accounts for about 80% of the total area of pixel regions.

Other than this, the reflector 115 of Comparative Example 2 is fabricated as in Comparative Example 1 through the photolithography process and the heat-treatment process.

Figure 2D:
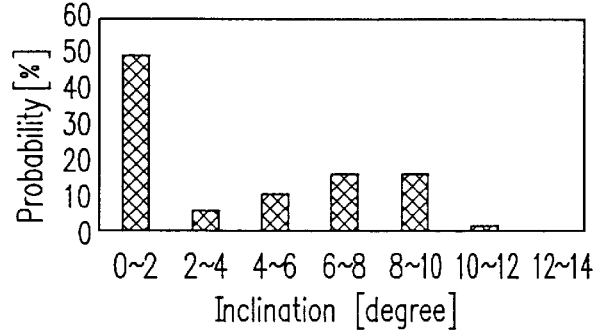
FIG. 2D is a graph showing the inclination distribution of the surface of a reflector of Comparative Example 2.

An inclination distribution of the surface of the reflector 115 having such a structure is obtained by using an interference microscope. The results for the reflector 115 of Comparative Example 2 are shown in a graph of FIG. 2D. As shown in the graph, the total area of the flat regions on the surface of the reflector 115 accounts for nearly 50% of the total area of the pixel regions.

Figure 4D:
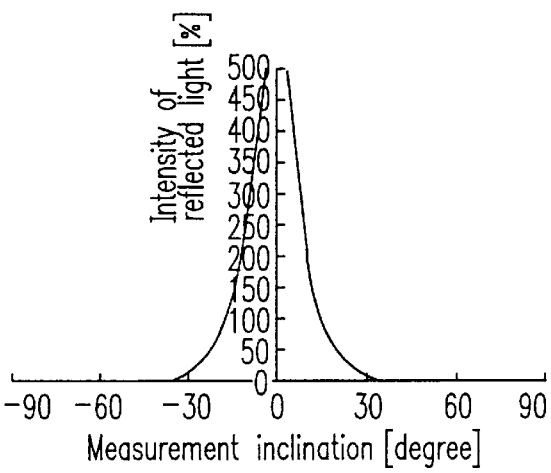
FIG. 4D is a graph showing the reflection characteristic of the reflector of Comparative Example 2.
Figure 4E:
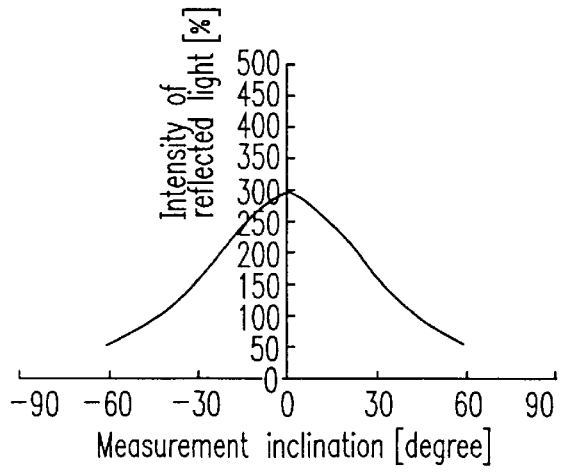
FIG. 4E is a graph showing the reflection characteristic of the reflector of Example 5.

FIG. 4D shows the results of the measurement for the reflection characteristic of the reflector 115 of Comparative Example 2. The measurement is performed in the same manner as described in Example 1. As shown in the graph of FIG. 4D, the intensity of the reflected light is high only in a relatively narrow range of about −15° to +15° with respect to the regular reflection direction. In particular, the intensity of the reflected light in the range of about −5° to +5° is extremely high as compared to that at other measurement inclinations.

Although the total area of the protrusions 112b is set at a very high proportion of about 80% with respect to the total area of the substrate, the amount of light which is reflected by the regular reflection becomes extremely large. This results from the interval between the adjacent protrusions 112b to be formed through a single photolithography process being as small as 0.5 μm. Such a small interval allows adjacent protrusions 112b to be joined with one another when melted, thereby consequently increasing the total area of the flat region. More specifically, a number of adjacent protrusions 112b form a massive portion. Only the periphery portion of the massive portion forms a curvature by being deformed when heated. Therefore, the other part of the massive portion consequently forms a flat region.

(EXAMPLE 3)

Hereinafter, a reflector and a method for fabricating the same according to Example 3 of the present invention will be described.

The method for fabricating the reflector according to Example 3 of the present invention will be described now with reference to FIGS. 7A to 7D illustrating the fabrication process of the reflector.

Figure 7A:
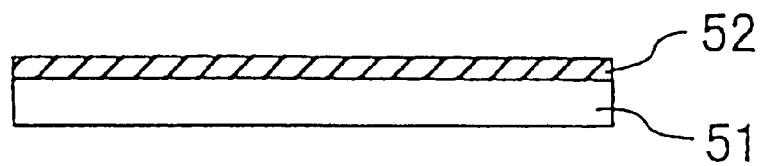
FIGS. 7A to 7D illustrate the fabrication process of a ref lector according to Example 3 of the present invention.

First, as shown in FIG. 7A an oxide is grown by sputtering on one surface of a transparent substrate, such as a glass substrate (e.g., "7059": CORNING INC.) 51 so as to form an oxide film 52. As a material for forming the oxide film 52, inorganic oxides such as $SiO_2$, $Al_2O_3$, $SiO$, $TiO_2$, $SnO_2$, ITO (Indium Tin Oxide) may be used. Considering the size of protrusions to be formed using a photosensitive resin and further the reflection characteristic of a reflector to be fabricated, the thickness of the oxide film 52 is preferably in the range of about 0.01 to 1 μm. In the present example, $SnO_2$ is used to form the oxide film 52 on "7059" (CORNING INC.) as the substrate about 1.1 mm thick, and the oxide film 52 is grown to be about 0.1 μm in thickness.

Figure 7B:
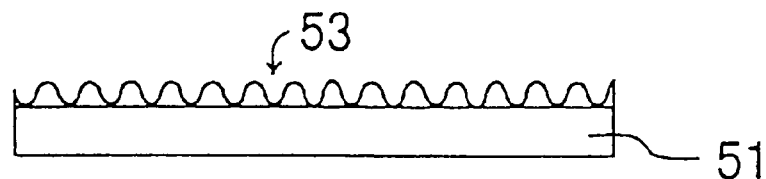

Then, the following process is performed as the photolithography process. The transparent substrate 51 including the oxide film 52 formed thereon is wet-etched by being immersed for about 10 minutes in a mixed solution (at about 25° C.) containing hydrofluoric acid (47% solution) and nitric acid (60% solution) at a weight ratio of about 1:100. Minute concave/convex portions 53 are thus formed on the surface of the glass substrate 51 as shown in FIG. 7B.

Figure 7C:
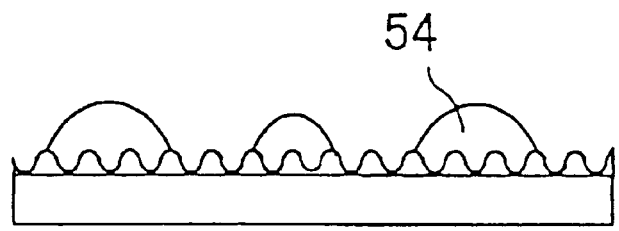

The oxide film 52 is etched as described above, thereby forming the minute concave/convex portions 53 on the transparent substrate 51. A photosensitive resin is applied over the concave/convex portions 53. After a photolithography process and a heat-treatment process, concave/convex portions 54 of photosensitive resin are provided as shown in FIG. 7C. The concave/convex portions 54 may be formed by employing a similar method as described in Example 1 or 2. As the photosensitive resin, "MFR" (JAPAN SYNTHETIC RUBBER CO., LTD.), "OFPR-800" (TOKYO OHKA KOGYO CO., LTD.) or the like may be used.

Figure 7D:
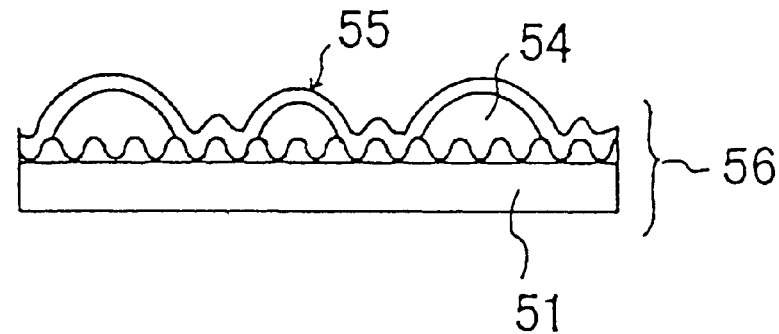

Then, as shown in FIG. 7D, a reflection film 55 is formed over the surfaces of the produced concave/convex portions 53 and 54 on the substrate 51. In the present example, the reflection film 55 is formed to be about 0.2 μm in thickness by vacuum evaporation of Al. As well as Al, other metals (e.g., Ni, Cr, Ag) which have a high reflectance and can be deposited to be a thin film without difficulty may be used. The reflection film 55 is preferably formed to be about 0.01 to 1.0 μm in thickness.

A reflector 56 of Example 3 is thus obtained through the fabrication process described above.

An inclination distribution of the surface of the reflector 56 is obtained by using an interference microscope. The surface of the reflector 56 includes the concave/convex portions 53 of the inorganic oxide and the concave/convex portions 54 of the photosensitive resin. As described above, the minute concave/convex portions 53 are formed before forming the concave/convex portions 54 through the photolithography process and the heat-treatment process. Due to the concave/convex portions 53 formed first, the area of the flat regions on the reflector 56 where the concave/convex portions 54 are not formed is reduced. As a result, the total area of the flat regions accounts for about 40% or less with respect to the total area of the pixel regions. This reduces the amount of light reflected by a regular reflection. When the intensity of the reflected light is actually measured in such a manner as described in Example 1, the reflector 56 exhibits the intensity of the reflected light exceeding about 60% of the reference intensity in a wide range of about −45° to +45° with respect to the regular reflection direction.

In the present example, the diameter of the minute concave/convex portion 53 to be formed on the surface of the substrate 51 in advance is set to be about 2 μm. However, the diameter is not limited thereto, but can take any value smaller than the diameter of the concave/convex portion 54 formed through the photolithography process and the heat-treatment process, and such that the adjacent concave/convex portions 53 to be formed do not overlap with one another.

(EXAMPLE 4)

Hereinafter, a reflector and a method for fabricating the same according to Example 4 of the present invention will be described.

Figure 8A:
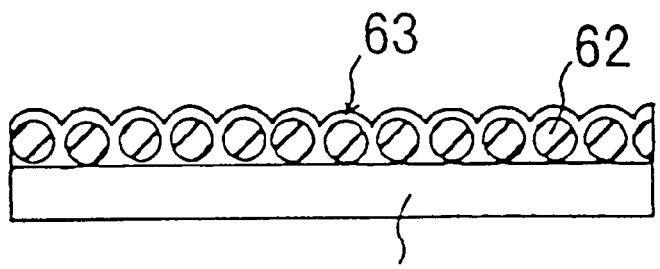
FIGS. 8A to 8C illustrate the fabrication process of a reflector according to Example 4 of the present invention.
Figure 8B:
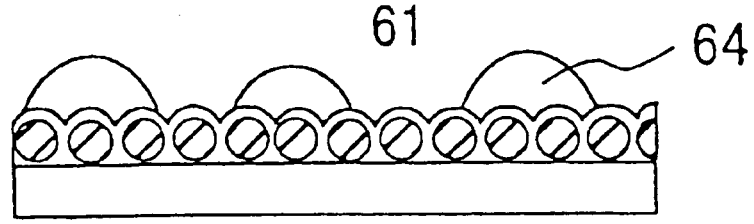
Figure 8C:
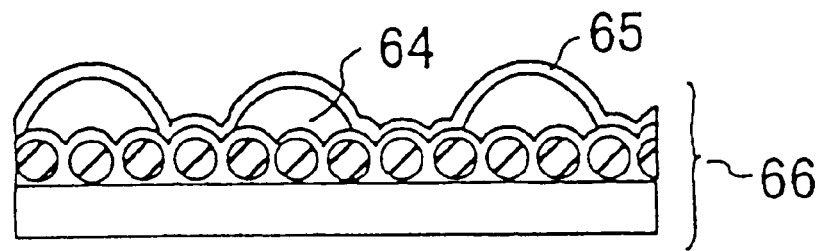

The method for fabricating the reflector according to Example 4 of the present invention will be described now with reference to FIGS. 8A to 8C illustrating the fabrication process of the reflector.

First, as shown in FIG. 8A, an organic insulating resin 63 mixed with minute particles 62 is applied onto one surface of a transparent substrate, such as a glass substrate. In the present example, spherically-shaped $SiO_2$ having a grain diameter of about 0.5 μm is used as the particles 62, and "7059" (CORNING INC.) is used for the substrate 61. As well as $SiO_2$, the material of the particles 62 may be glass, plastic, metal, etc. The particles may have any kind of a fixed or unfixed shape such as a spherical shape, a fibrous shape, a spindle shape, etc. The amount of the particles 62 to be mixed is preferably about 10% of the organic insulating resin 63. As the organic insulating resin 63, for example, "OCD type 7" (TOKYO OHKA KOGYO CO., LTD.) may be used. Various other resins (e.g., a thermosetting resin, a photo-curing resin) may also be used for the organic insulating resin 63.

The organic insulating resin 63 mixed with the minute particles 62 is spin-coated on the surface of the substrate 61 at, preferably, about 500 to 3000 rpm so as to obtain a layer having a desired thickness. In the present example, the organic insulating resin 63 is applied onto the substrate for about 30 seconds while spinning the substrate 61 at about 1000 rpm. Then, a heat treatment at about 90° C. for about 3 minutes is performed, followed by another heat treatment at about 250° C. for about 60 minutes, after which the resin is cured, thus forming an organic insulating resin layer 63 to be about 1 μm-thick on the glass substrate 61.

Through the step above, a number of minute concave/convex portions of the particles 62 are formed on the glass substrate 61, as shown in FIG. 8A.

Then, as shown in FIG. 8B, concave/convex portions 64 of a photosensitive resin are further formed on the surface of the organic insulating resin layer 63 by employing a similar method as described in Example 1 or 2. Subsequently, a reflection film 65 is formed as shown in FIG. 8C, thereby obtaining a reflector 66 of Example 4.

The concave/convex portions on the reflector 66 are formed by the particles 62 and the photosensitive resin. As described above, the minute concave/convex portions 63 are formed before forming the concave/convex portions 64 through the photolithography process and the heat-treatment process. Due to the concave/convex portions 63 formed first, the area of the flat regions on the reflector 66 where the concave/convex portions 64 are not formed is reduced. As a result, the total area of the flat regions accounts for about 40% or less with respect to the total area of the pixel regions. When the intensity of the reflected light is actually measured in such a manner as described in Example 1, the reflector 66 exhibits the intensity of the reflected light exceeding about 60% of the reference intensity in a wide range of about −45° to +45° with respect to the regular reflection direction.

In the present example, other than mixing particles, sandblasting, polishing and the like may be employed as the method for forming the concave/convex portions on the glass substrate 61 in advance. In the present example, the diameter of the minute concave/convex portion to be formed on the surface of the substrate 61 in advance is set to be about 0.5 μm. However, the diameter is not limited thereto, but, depending upon the characteristics of the resin to be employed, can take any value smaller than the diameter of the concave/convex portion 64 formed through the photolithography process, and such that the adjacent concave/convex portions do not overlap with one another.

(EXAMPLE 5)

Hereinafter, a reflector and a method for fabricating the same according to Example 5 of the present invention will be described.

The method for fabricating the reflector according to Example 5 of the present invention will be described now with reference to FIGS. 9A to 9L, where FIGS. 9G to 9L are top views each illustrating one of the fabrication steps for a reflector 76, whereas FIGS. 9A to 9F are each cross-sectional view taken along the line A to A' in FIGS. 9G to 9L, respectively.

Figure 9A:
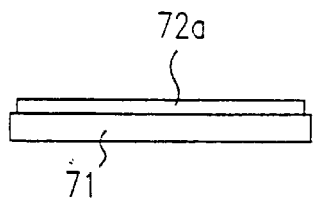
FIGS. 9A to 9L illustrate the fabrication process of a reflector according to Example 5 of the present invention, where
Figure 9B:
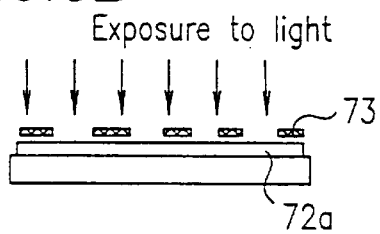
Figure 9C:
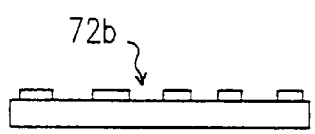

First, the photolithography process is performed. As shown in FIGS. 9A and 9G, a photosensitive resin is spin-coated on one surface of a transparent substrate, such as a glass substrate 71 so as to form a photosensitive resin layer 72a. In the present example, "OFPR-800" (TOKYO OHKA KOGYO CO., LTD.) as the photosensitive resin is applied onto "7059" (CORNING INC.) as the substrate about 1.1 mm thick so as to form a photosensitive resin layer 72a to be about 1.2 μm-thick. Then, the substrate is pre-baked for about 30 minutes at about 100° C., after which a photomask 73 having a predetermined pattern is placed over the glass substrate 71 as shown in FIGS. 9B and 9H. Then, the substrate is exposed to light and developed with a developing solution, (e.g., 2.38% of NMD-3: TOKYO OHKA KOGYO CO., LTD.), thus forming minute cylindrical depressions 72b in the photosensitive resin layer 72a as shown in FIGS. 9C and 9I.

The photomask 73 used in the present example includes a plurality of minute circular light-transmitting regions which are randomly distributed therein. The photosensitive resin used in the present example is of a negative type. When using a positive type photosensitive resin, however, the pattern of the photomask 73 needs to be inverted.

Figure 9D:
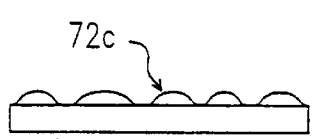
Figure 9E:
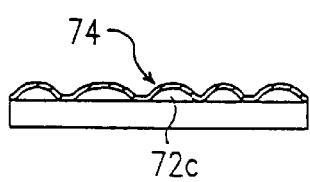
Figure 9F:
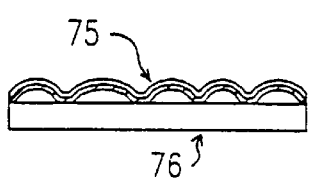
Figure 9G:
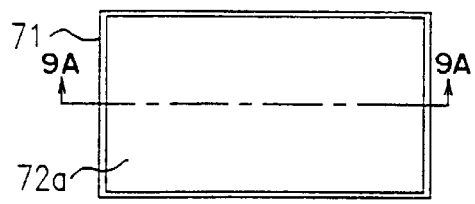
Figure 9H:
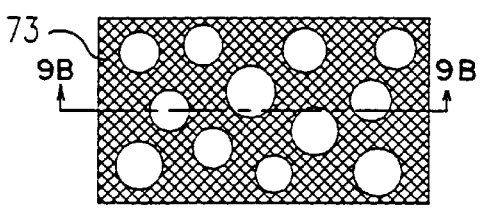
Figure 9I:
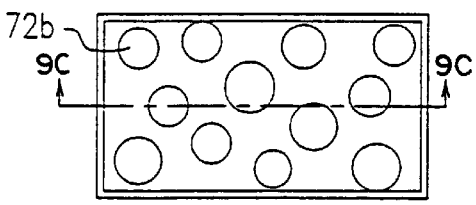
Figure 9J:
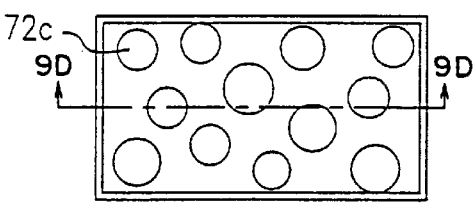

The cylindrical depressions 72b in the photosensitive resin layer 72a on the substrate 71 are rounded off by the following heat treatment process at about 120 to 250° C., thereby obtaining convex/concave portions 72c, as shown in FIGS. 9D and 9J, having a smooth continuous surface without any sharp edges thereon. Then, the resin is cured. In present example, the heat treatment is performed at about 200° C. for about 30 minutes.

Figure 9K:
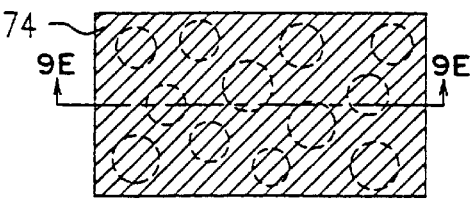

Subsequently, a photosensitive resin is further formed on the surface of the convex/concave portions 72c as shown in FIGS. 9E and 9K in order to make the surface of the convex/concave portions 72c even smoother. The photosensitive resin, which may be the same resin used for the photosensitive resin layer 72a, is spin-coated. The thickness of the formed photosensitive resin layer is preferably set to be about 0.3 to 5.0 μm. In the present example, the thickness of the photosensitive resin layer is set to be about 0.3 μm. Then, through another heat treatment, the photosensitive resin is deformed, thus forming a second convex layer 74. In the present example, the heat treatment is performed at about 200° C./ for about 30 minutes. Thus, there is provided a smoother surface including convex/concave portions with reduced flat regions.

Figure 9L:
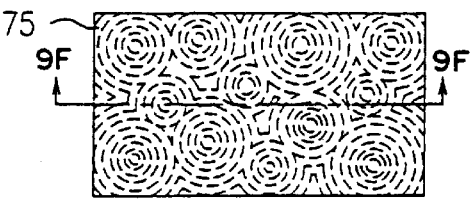

Following the above steps, as shown in FIG. 9F, a reflection film 75 is formed over the produced surface with convex/concave portions of the substrate 71. In FIG. 9L, dashed lines represent contour lines of the reflection film 75. In the present example, the reflection film 75 is formed by vacuum evaporation of Al so as to be about 0.2 μm in thickness. As well as Al, any of the metals described in Example 1 may be used. The reflection film 75 is preferably formed to be about 0.01 to 1.0 μm in thickness.

A reflector 76 of Example 5 is thus obtained through the fabrication process described above.

Hereinafter, the characteristics of the reflector 76 of Example 5 will be described.

Figure 2E:
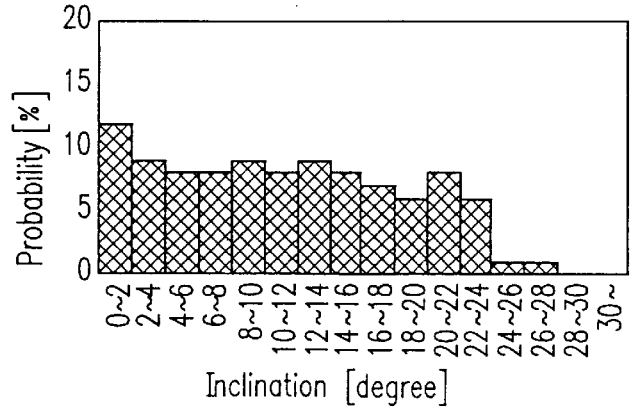
FIG. 2E is a graph showing the inclination distribution of the surface of a reflector of Example 5.
Figure 10:
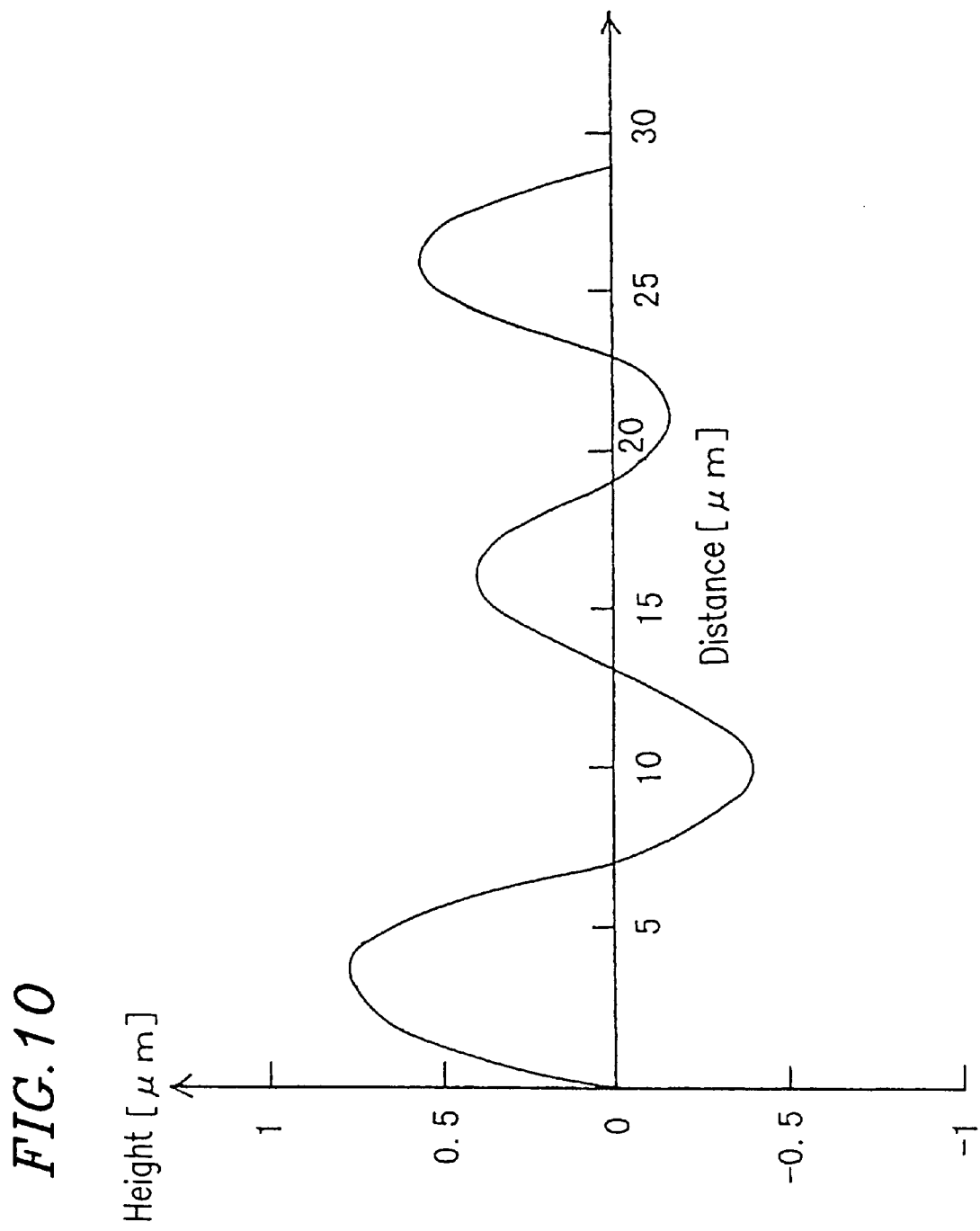
FIG. 10 is a graph illustrating the cross section of the reflector according to Example 5 of the present invention.

FIG. 10 shows the results of a measurement of the surface shape of the reflector 76 from above by using an interference microscope. In the figure, the x-axis represents a distance from an arbitrary point on the reflector, whereas the y-axis represents the height of the concave/convex portions from the surface of the substrate 71. The surface of the reflector 76 has dimples with gentle slopes distributed at random positions as shown in cross section in FIG. 10. Moreover, the results of measurement for the inclination distribution of the surface of the reflector 76 are shown in FIG. 2E. As shown in FIG. 2E, the total area of the flat regions on the surface of the reflector 76 accounts for only 12% of the total area of the pixel regions.

The reflection characteristic of the reflector 76 of Example 5 is measured as in Example 1. The results are shown in a graph of FIG. 4E. As shown in the graph, the reflection characteristic of the reflector 76 is such that the intensity of the reflected light exceeds about 60% of the reference intensity throughout a wide range of about −45° to +45° with respect to the regular reflection direction. In particular, in the range of about −35° to +35°, the reflector 76 exhibited an intensity of the reflected light higher than the reference intensity.

As described above, in Example 5, the photosensitive resin applied over the convex/concave portions 72c in the second resin application is melted when heated, thereby filling up the corners and the bottom of the dimples. Moreover, the dimples with gentle slopes formed through a single photolithography process are distributed at random positions. Thus, the reflector 76 having desirable characteristics as the reflectors of Examples 1 to 4 is obtained.

In the present example, each of the dimples (or concave portions) formed by the photolithography process is circular (as a cross section in a plane parallel to the substrate). However, similar effects can be realized with concave portions having polygonal cross sections.

Now, the relationship between the optical characteristics of a reflector and the brightness of a liquid crystal display device incorporating the reflector will be described. It has been studied which optical characteristic of a reflector most influences the brightness of a liquid crystal display device incorporating the reflector (when such a liquid crystal display device is fabricated and viewed with human eyes). As a result of this, the viewing angle dependency of the intensity of the reflected light measured under a single light source has been found to most influence the brightness of the liquid crystal display device as viewed under a plurality of light sources. This will be described more in detail below with reference to FIGS. 16A to 18B.

Figure 16A:
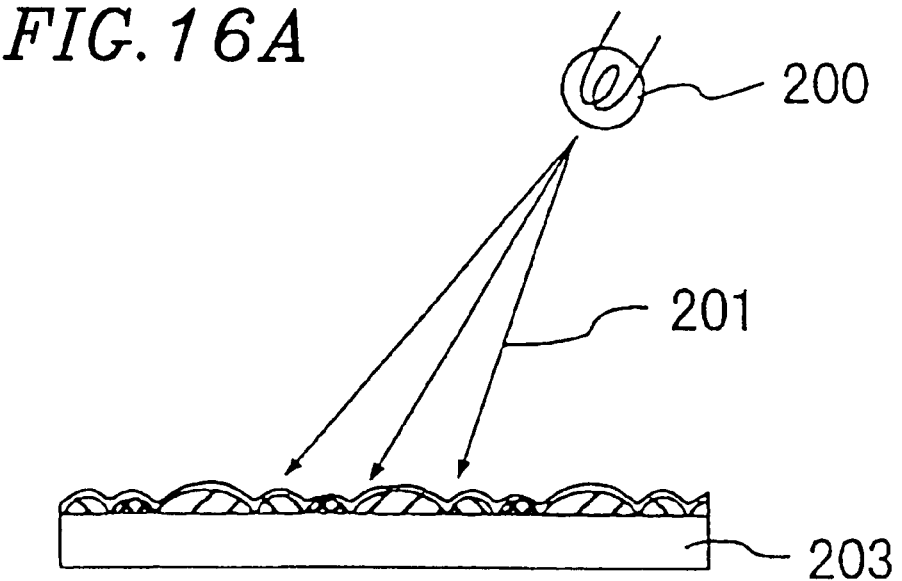
FIG. 16A is a diagram showing incident light obtained from a single light source.
Figure 16B:
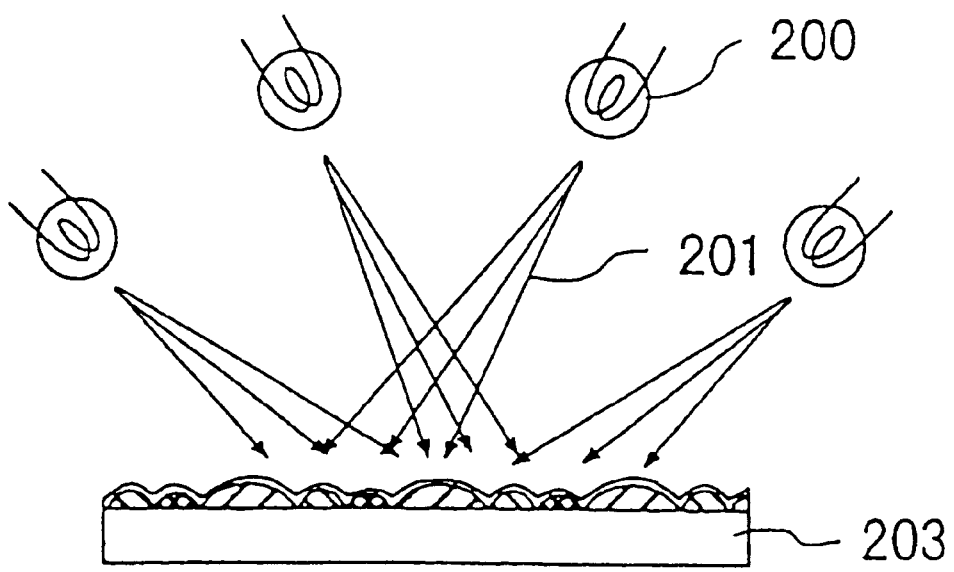
FIG. 16B is a diagram showing incident light obtained from a number of light sources.

When only one light source 200 is provided as shown in FIG. 16A, light 201 is incident upon a reflector 203 only from a limited range of directions. Accordingly, the intensity of the light 201 incident upon the reflector 203 is high only in the limited directions. On the other hand, when a number of light sources 200 are provided at different positions as shown in FIG. 16B, the light 201 is incident upon the reflector 203 from every directions. Accordingly, the intensity of the incident light 201 becomes relatively uniform in every directions as compared to the case of the single light source.

Figure 17A:
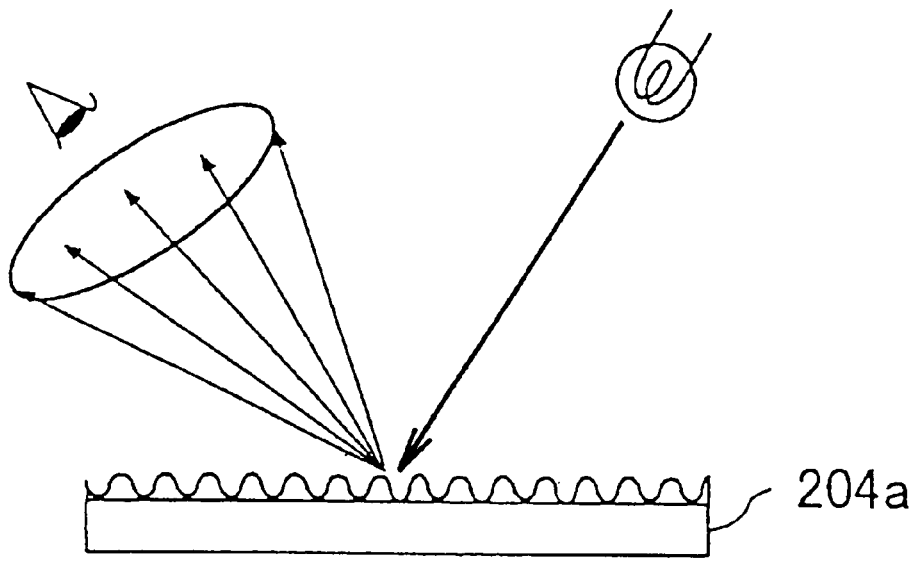
FIG. 17A shows the range of directions to which light is reflected by the reflector of the present invention under a single light source.
Figure 17B:
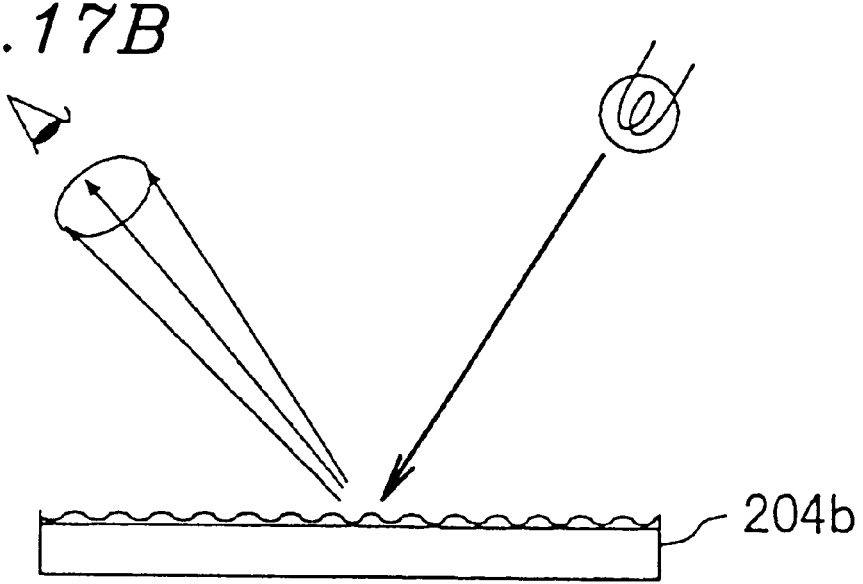
FIG. 17B shows the range of directions to which light is reflected by a conventional reflector under a single light source.
Figure 18A:
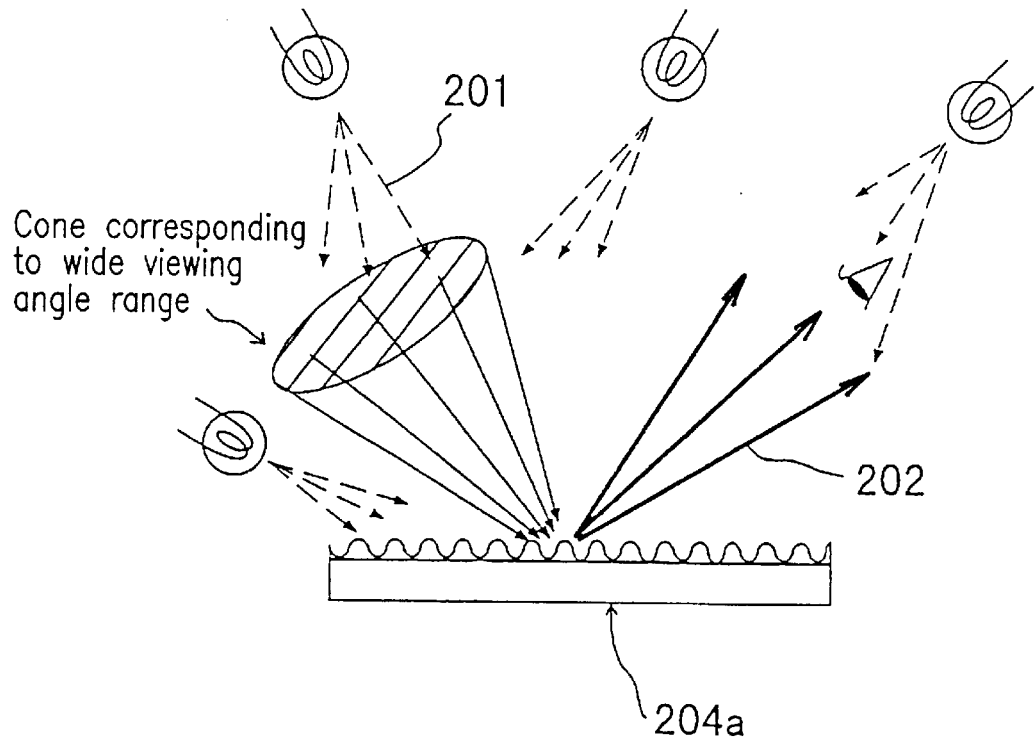
FIG. 18A shows the range of directions to which light is reflected by the reflector of the present invention under a number of light sources.
Figure 18B:
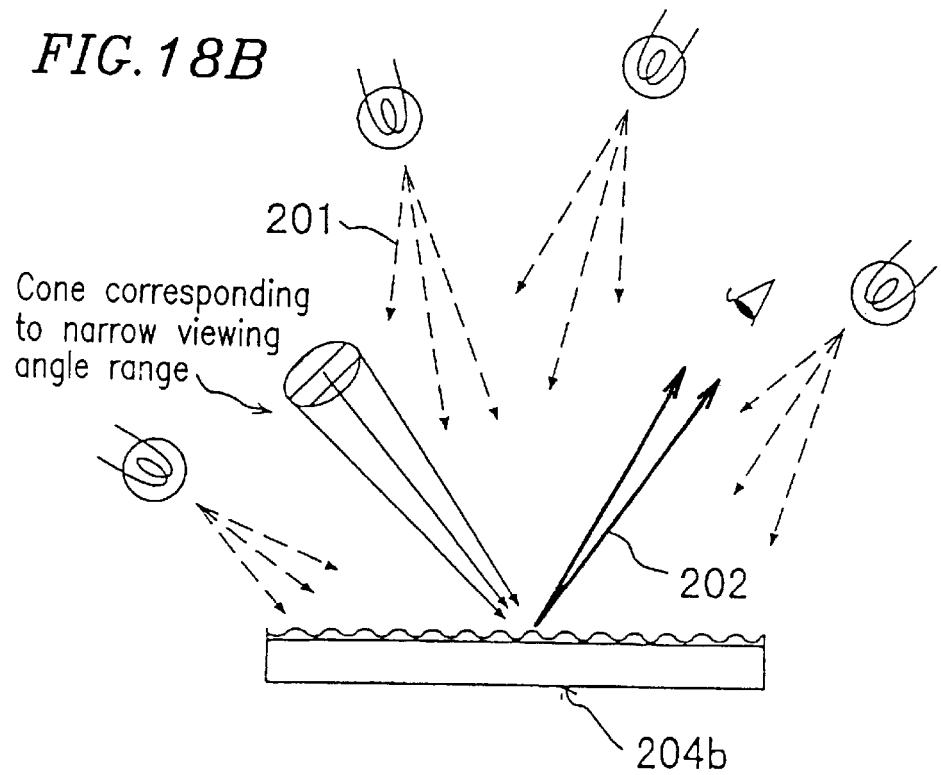
FIG. 18B shows the range of directions to which light is reflected by a conventional reflector under a number of light sources.

FIG. 17A shows a reflector 204a which is one of the reflectors of Examples 1 to 5 exhibiting the intensity of the reflected light of about 60% or more of the reference intensity in a wide range of about −45° to +45° with respect to the regular reflection direction. Under the situation as shown in FIG. 16B, the reflector 204a can reflect the incident light 201 toward a wide range of viewing directions (represented by a cone in FIG. 18A). It is believed that such an effect of the improved intensity of the reflected light 202 is observed since the light path has reversibility and, therefore, the incident light 201 can be reflected toward a wide range of directions. On the other hand, a reflector 204b shown in FIG. 17B is a reflector of one of Comparative Examples 1 and 2 which reflects a large portion of light incident thereon by the regular reflection and therefore directs the light to a limited range of directions. Such a reflector 204b can direct the incident light 201 only to a limited range of directions as shown in FIG. 18B and, therefore, cannot be expected to improve the brightness of the reflected light 202.

Brightness of display has been measured for liquid crystal display devices incorporating different reflectors having different reflectances at a viewing direction inclined by about 45° from the direction of the regular reflection. The results are shown in Table 2 below. It has been shown that a reflector having an reflectance of about 60% or higher at the 45° inclination is needed to realize bright display.

TABLE 2

| Reflectance (%) at 45° inclination from regular reflection component | 30 | 40 | 50 | 60 | 70 |
|---|---|---|---|---|---|
| Display brightness in a room with a plurality of fluorescent lights | X | X | Δ | ○ | ⊙ |

X:Very dark
Δ:Dark
○:Bright
⊙:Very bright

Figure 22:
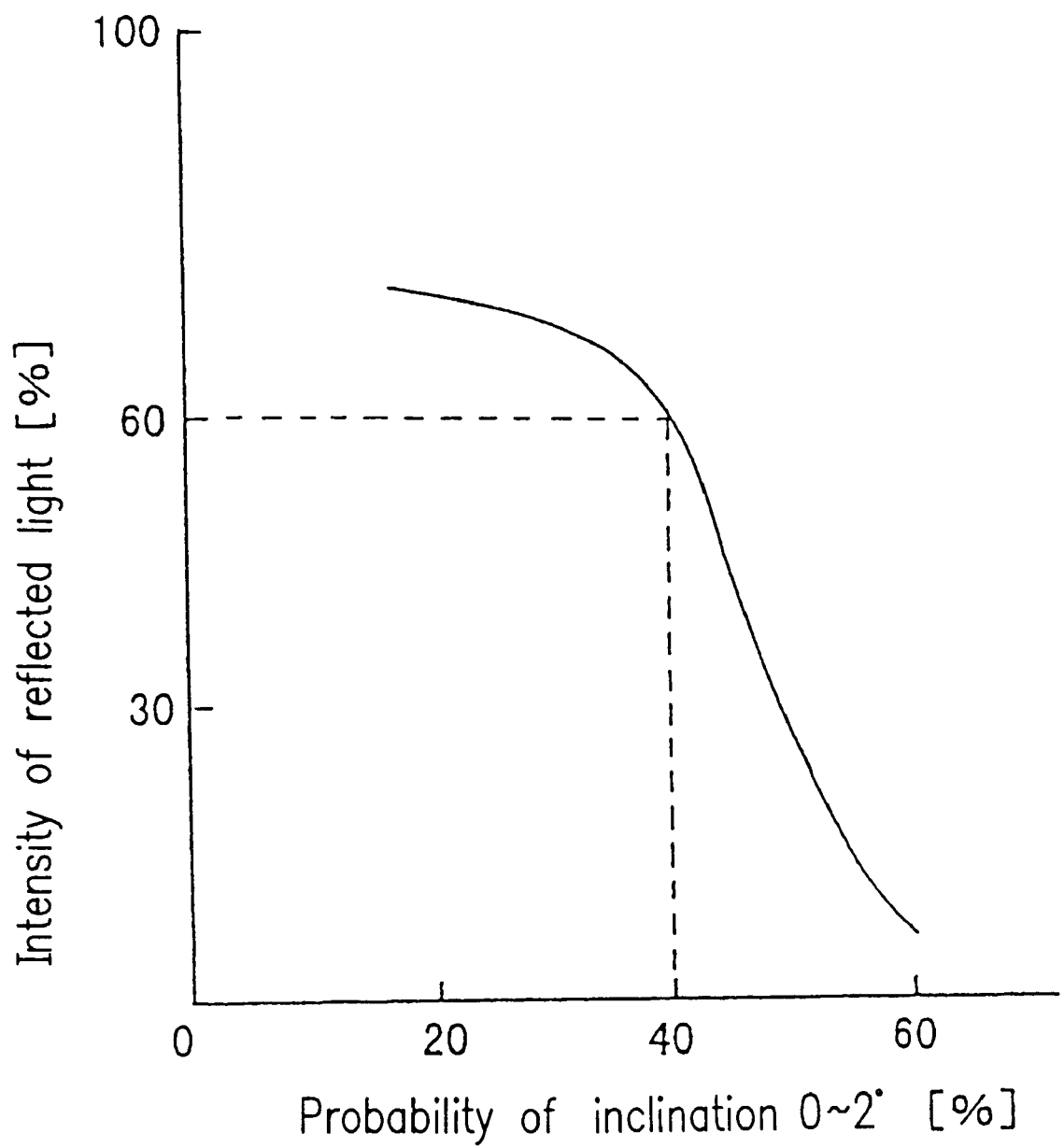
FIG. 22 is a graph showing the relationship between the surface shape of the reflector and the intensity of the reflected light.

Moreover, the relationship between the shape of concave/convex portions on a reflector and the optical characteristics thereof is measured. In particular, the total area of the flat regions on the reflector with respect to the total area of the pixel regions and the reflectance thereof at the 45° inclination from the regular reflection direction are measured. The results are shown in FIG. 22. As can be seen from FIG. 22, as the area of the flat regions increases, the proportion of the amount of light reflected in the direction of the regular reflection with respect to the amount of entire reflected light increases, thereby reducing the reflectance of the reflector in a direction inclined by about 45° with respect to the regular reflection direction. It has been also shown that the total area of the flat regions has to be about 40% or less with respect to the total area of the pixel regions in order to realize bright display.

(EXAMPLE 6)

Hereinafter, a reflective liquid crystal display device according to Example 6 of the present invention incorporating the reflector of the present invention will be described.

The reflective liquid crystal display device of Example 6 incorporates a reflector having a surface similar to that of the reflector of Example 5, and performs display in the GH mode where no polarizer is used.

Figure 11:
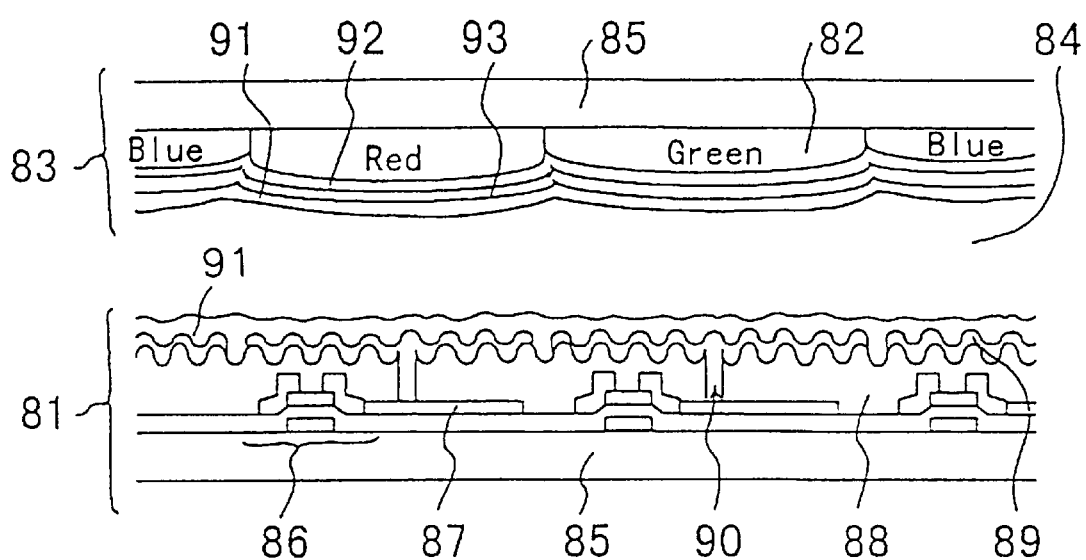
FIG. 11 is cross-sectional view showing the structure of a reflective liquid crystal display device according to Example 6 of the present invention.

FIG. 11 shows the structure of the reflective liquid crystal display device according to Example 6 of the present invention.

As shown in FIG. 11, a reflector 81 which also functions as an active matrix substrate is attached to a counter substrate 83 having a color filter 82 with a predetermined interval therebetween. A liquid crystal layer 84 is disposed between the reflector 81 and the counter substrate 83 and sealed therein. In the present example, a GH mode liquid crystal material is used for the liquid crystal layer 84. The reason is as follows. The reflector 81 does not preserve the polarization of incident light very well. Accordingly, the contrast ratio of the display decreases when the reflector 81 is employed in a liquid crystal display device which performs display in a birefringent mode where a single polarizer is used. The GH mode is employed in the present example for this reason.

The structure of the reflector 81 of Example 6 will be described now.

TFTs (Thin Film Transistors) 86 are formed on a glass substrate or the like as an insulating substrate 85. Pixel electrodes 87 are provided so as to be connected to the drain electrodes of the TFTs 86. A photosensitive resin layer 88 is formed so as to cover the TFTs 86 and the pixel electrodes 87. The photosensitive resin layer 88 corresponding to the photosensitive resin layer formed on the glass substrate of the reflectors of Examples 1 to 5 has convex/concave portions formed by one of the methods described in Examples 1 to 5. Reflective pixel electrodes 89 corresponding to the reflection film in Examples 1 to 5 are formed in a matrix on the photosensitive resin layer 88, and are electrically connected to the pixel electrodes 87 via contact holes 90. An alignment film 91 is formed so as to entirely cover the reflective pixel electrodes 89. The surface of the reflector 81 having such a structure is similar to that of the reflector of Example 5.

On the other hand, the counter substrate 83 includes an insulating substrate 85 of glass or the like. The color filter 82 including red portions, green portions and blue portions is provided on the substrate 85. The thickness of the color filter 82 varies in portions of different colors, thereby generating difference in thickness between adjacent ones of the colored portions. A flattening layer 92 is formed on the color filter 82 for reducing the difference in thickness. Counter electrodes 93 and an alignment film 91 are further formed in this order on the flattening layer 92.

In producing the above-described reflective liquid crystal display device, conditions (primarily in respect to the characteristics of the liquid crystal layer) are optimized for the reflector 81 to be used.

First, regarding the thickness of the cell composed of the reflector 81, the counter substrate 83 and the liquid crystal layer 84, as the cell is made thicker, the absorption of light by molecules of dye contained in the liquid crystal layer 84 becomes higher, thereby displaying more refined black as opposed to conventional devices. However, more importantly, the response rate (i.e., the rate at which the orientation of the liquid crystal and that of the dye molecules contained in the liquid crystal layer change) decreases in proportion to the square of the cell thickness. Therefore, considering the response rate as the most important condition, the maximum cell thickness is preferably set to be about 10 $\mu$m (more preferably, about 7 $\mu$m) so as to achieve a response rate of about 200 ms, which is necessary for practical use. On the other hand, considering the contrast of display and for facilitating the fabrication, the minimum cell thickness is preferably set to be about 3 $\mu$m (more preferably, about 4 $\mu$m). In the present example, the cell is fabricated so as to be about 5 $\mu$m in thickness. The "cell thickness" as used herein is a value obtained by subtracting the thicknesses of the resin layer and the metal layer from the thickness of the cell measured at the contact hole, where no convex/concave portions exist.

Next, the twist angle of the liquid crystal material is preferably set to be about 180° to 360°. When employing a GH type liquid crystal material, ambient light needs to be absorbed by the dye molecules which are contained as the "guest" in the liquid crystal material as the "host" and are aligned in accordance with the orientation of the liquid crystal molecules. For this reason, the minimum twist angle is preferably set to be about 180°. The maximum twist angle is preferably set to be about 360° considering the bistability of the liquid crystal material. In the present example, the twist angle is set to be about 240°.

Figure 12:
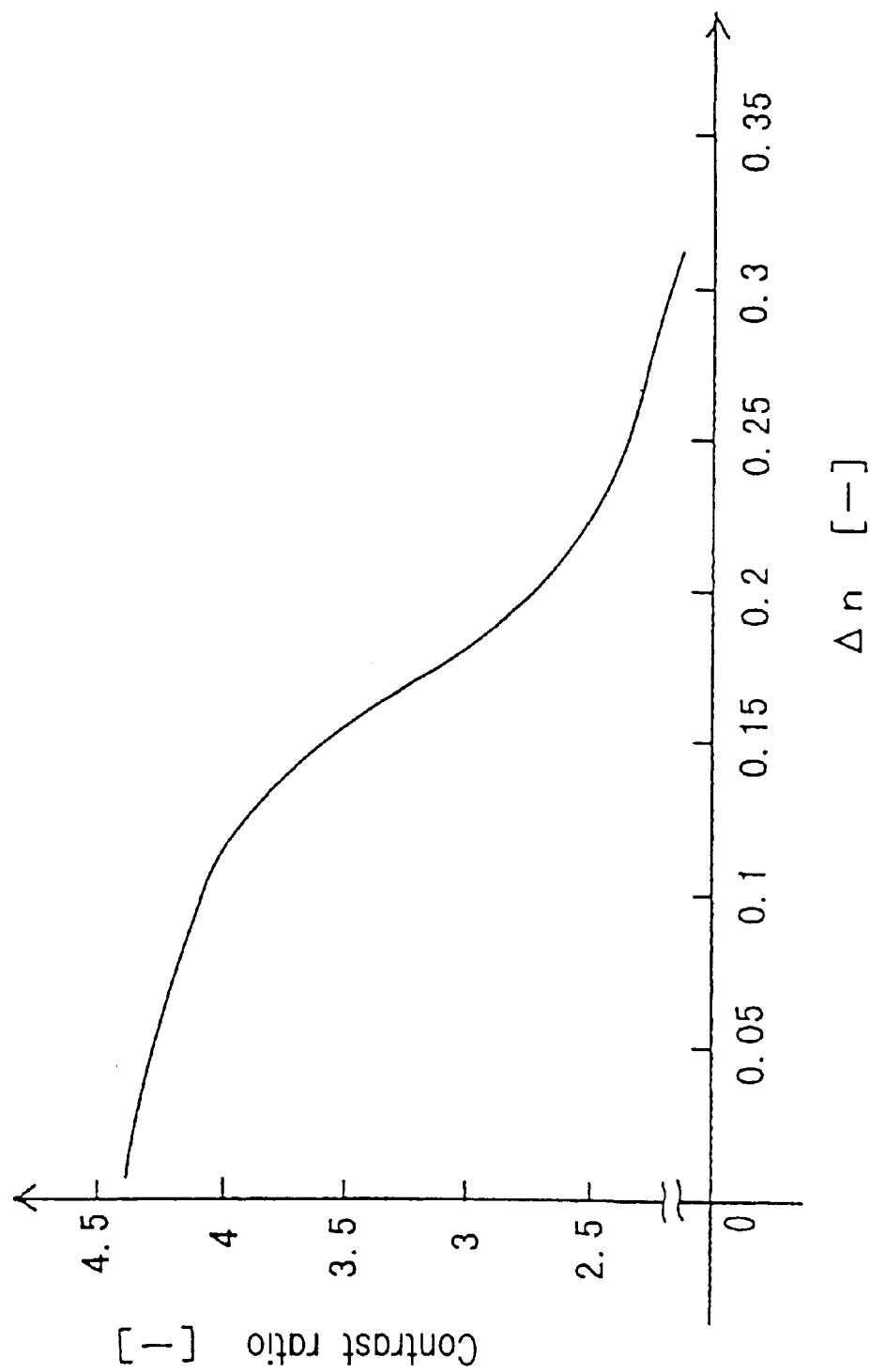
FIG. 12 is a graph showing the relationship between a birefringence Δn and a contrast of a liquid crystal display device.

Regarding the birefringence $\Delta$n of the liquid crystal material, since the incident light cannot follow the twist of the liquid crystal material in such a range of twist angle as above, the display quality (particularly the contrast ratio), when actually used, becomes dependent upon the birefringence $\Delta$n. FIG. 12 shows the relationship between the birefringence $\Delta$n of the liquid crystal material and the contrast ratio. Displayed images are generally considered "comfortable-to-view" when the contrast ratio is about 4 or higher, and "uncomfortable-to-view" when the contrast ratio is less than about 3.5. Therefore, the birefringence $\Delta$n of the liquid crystal material is preferably set to be about 0.15 or less (more preferably, about 0.10 or less). In the present example, the birefringence $\Delta$n of the liquid crystal material is set to be about 0.09.

Moreover, in the above range of twist angle, even slight inconsistency in the cell thickness results in stripe domains to be easily generated, thereby causing hysteresis. In such a case, gray-scale display cannot be realized. Furthermore, in the liquid crystal display device of the present invention, the reflector including the convex/concave portions on its surface is internally in contact with the liquid crystal layer. Therefore, the convex/concave portions on the reflector give rise to the stripe domains and thus cause hysteresis, even in a liquid crystal material which is set to have a ratio d/p (d: cell thickness, p: normal pitch of the liquid crystal material) such that the stripe domains would not occur on a flat reflector. In view of these disadvantages, a suitable shape of the convex/concave portions has been studied for realizing a reflector with excellent optical characteristics and reduced generation of the stripe domains.

Figure 13:
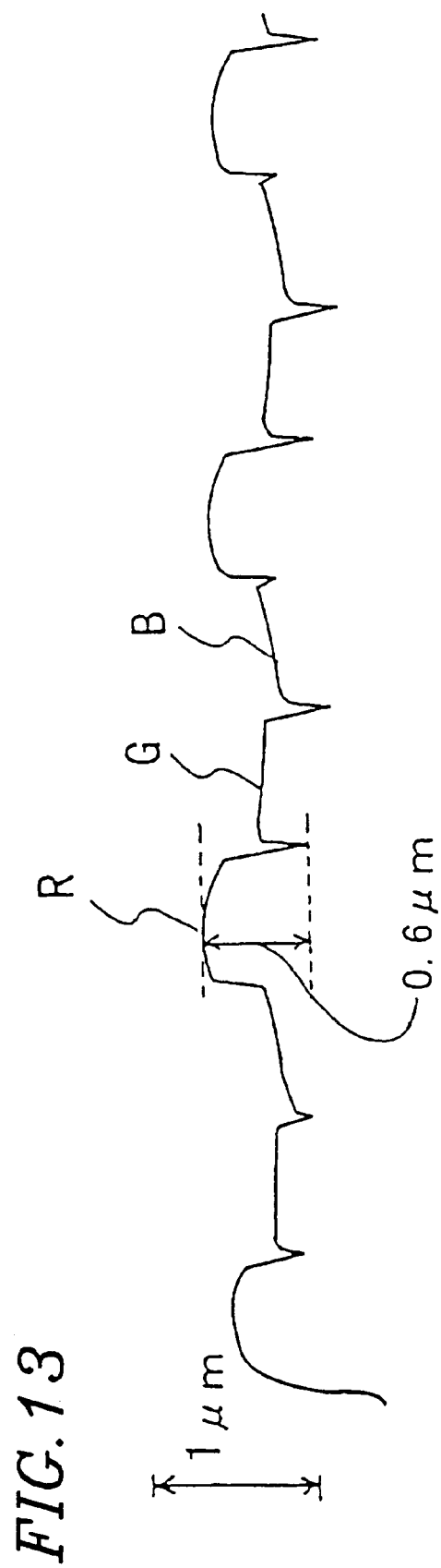
FIG. 13 is a cross-sectional view showing a color filter used in Examples 6 and 7.

An optically active substance is added to a liquid crystal material whose birefringence $\Delta$n is about 0.09 so as to adjust the d/p ratio to be about 0.58. The reflective liquid crystal display device of Example 6 is produced using such a liquid crystal material. The liquid crystal display device has a cell thickness of about 5 $\mu$m and a twist angle of about 240°. As the liquid crystal display device is observed through a microscope with a voltage being applied thereto, the stripe domains are generated in G (green) pixels and B (blue) pixels along grooves between the convex portions. This results from R (red) pixels being thicker than the G and B pixels as shown in a cross-sectional view of FIG. 13 showing the color filter used in the present example. Herein, the G, B and R pixels are pixels where green, blue and red portions, respectively, of the color filter are located. The greatest difference in thickness between the colored portions of the color filter is observed to be about 0.3 $\mu$m. It is therefore believed that the stripe domains are generated in the G and B pixels whose cell thicknesses are less than that of the R pixels.

A similar liquid crystal display device is produced so as to have a d/p ratio of about 0.60. The stripe domains are not generated when a voltage is applied to the device. It has been shown that the d/p ratio of the liquid crystal display device needs to be about 0.6 or higher so as not to generate the stripe domains, considering the allowance for the inconsistency in the cell thickness and the allowance for the difference in thickness of the color filter.

When comparing between two liquid crystal display devices having diameters of the convex/concave portions of about 9 μm and about 5 μm, respectively, with the d/p ratio being 0.58 (pitch: about 8.6 μm) for both of the devices, the device with the convex/concave diameter of about 5 μm has shown to generate less stripe domains than 9 μm. Therefore, it is believed that stripe domains are more likely to be generated when the pitch of the liquid crystal material used in the device is substantially equal to the diameter of the convex/concave portion.

Moreover, it is necessary to operate the device at a low power consumption level considering the voltage resistance of the driving circuit, the reliability of the switching element (TFT) and the liquid crystal layer, and the portability of the device. For this reason, the dielectric constant anisotropy Δε is preferably set to be about 4 to 12. As shown in Table 3, when Δε is less than about 4 and the cell thickness is about 5 μm, the threshold voltage exceeds about 3V. In such a case, there is required a driver with a high voltage resistance. However, such a driver is an undesirable load on the switching element and the liquid crystal layer. When Δε exceeds about 12, stains and remaining images (i.e., ghost images) are likely to occur even by aging over a short period of time. In the present example, Δε is set to be about 7.

TABLE 3

| Liquid crystal material | Δε | Retention (%) | Threshold voltage (V) | Occurence of linear remaining images and stains (*) |
| --- | --- | --- | --- | --- |
| A | 12.3 | 96.4 | 1.8 | X |
| B | 12.0 | 96.2 | 1.8 | ○ |
| C | 10.9 | 95.3 | 1.8 | ○ |
| D | 8.6 | 94.5 | 2.0 | ○ |
| E | 7.0 | 96.5 | 2.2 | ⊚ |
| F | 5.8 | 96.6 | 2.4 | ⊚ |
| G | 5.7 | 96.7 | 2.6 | ⊚ |
| H | 5.9 | 95.5 | 2.5 | ⊚ |
| I | 4.8 | 94.8 | 2.7 | ⊚ |
| J | 4.0 | 95.1 | 3.0 | ⊚ |
| K | 3.5 | 96.0 | 3.4 | ⊚ |

Figure 14A:
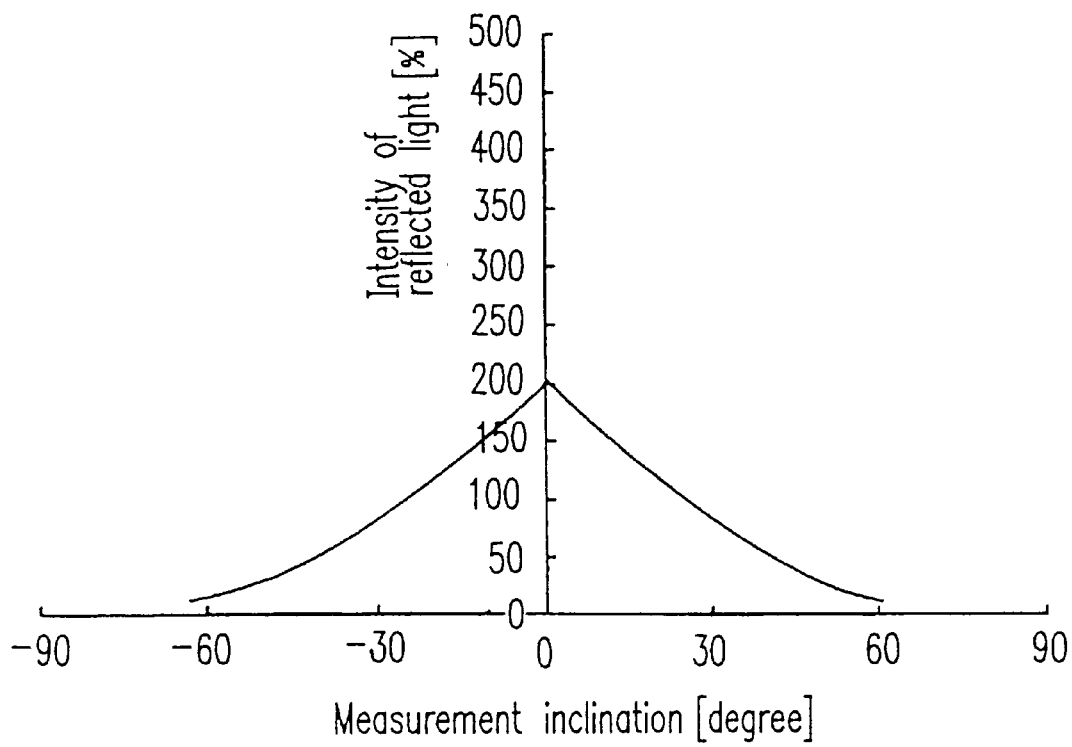
FIG. 14A is a graph showing the viewing angle dependency of the intensity of the reflected light when using a reflective liquid crystal display device of Example 6.
Figure 14B:
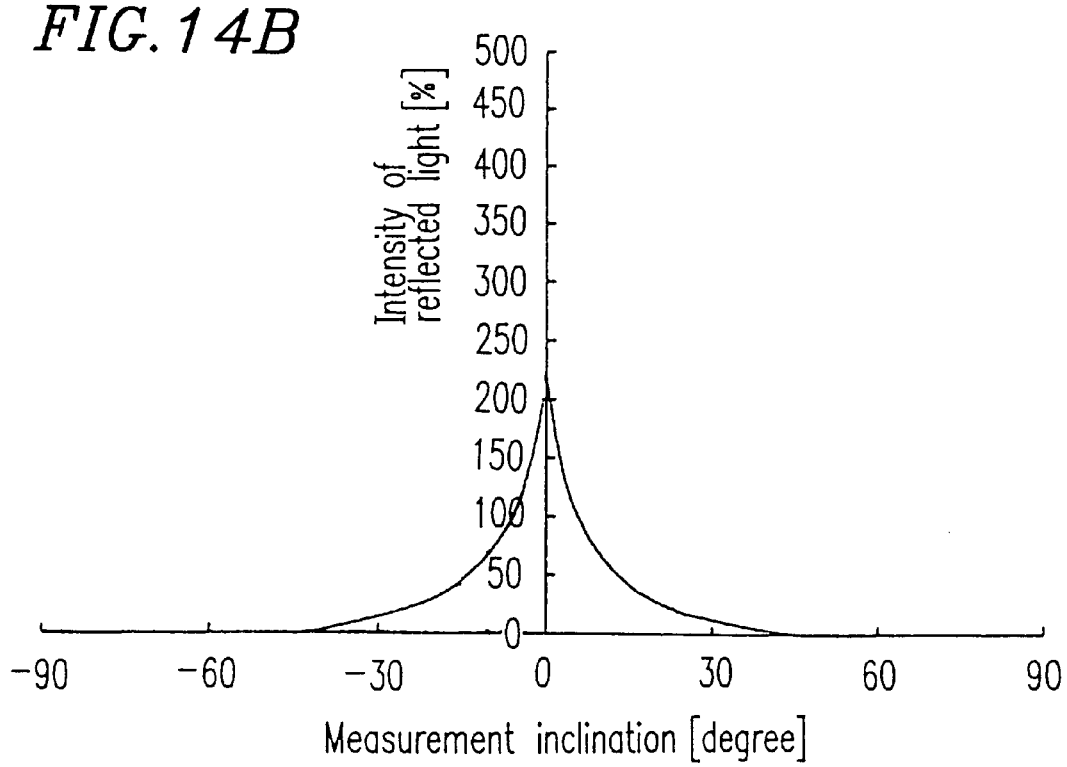
FIG. 14B is a graph showing the viewing angle dependency of the intensity of the reflected light when using a conventional reflective liquid crystal display device.
Figure 15A:
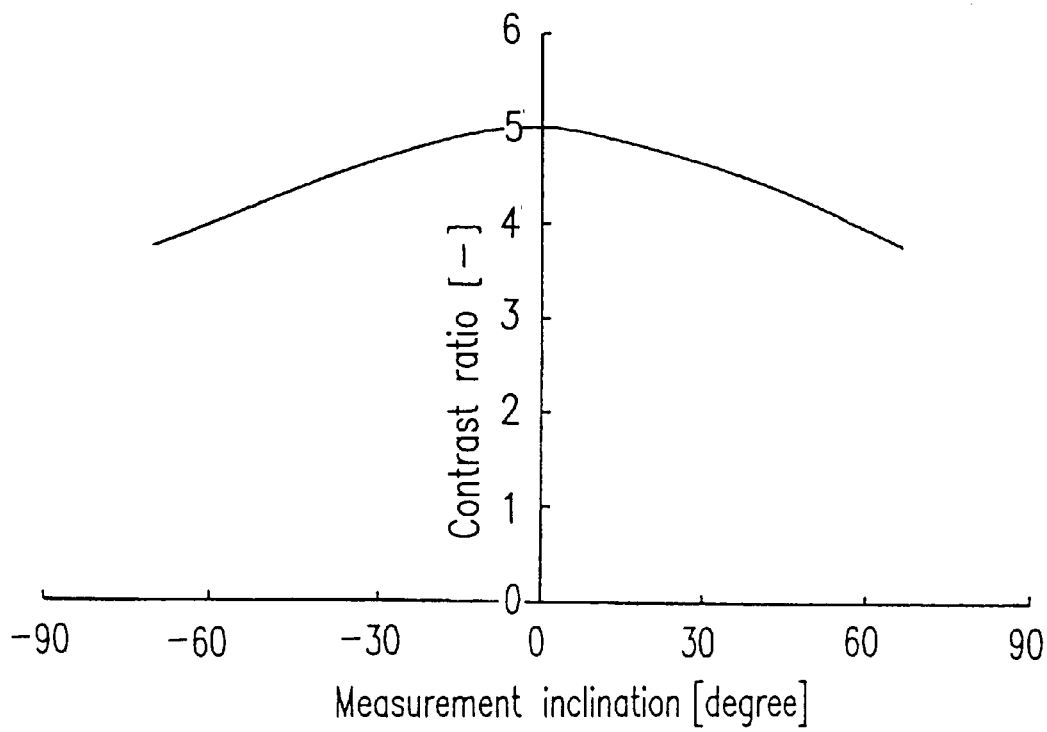
FIG. 15A is a graph showing the viewing angle dependency of the contrast ratio of a reflective liquid crystal display device of Example 6.
Figure 15B:
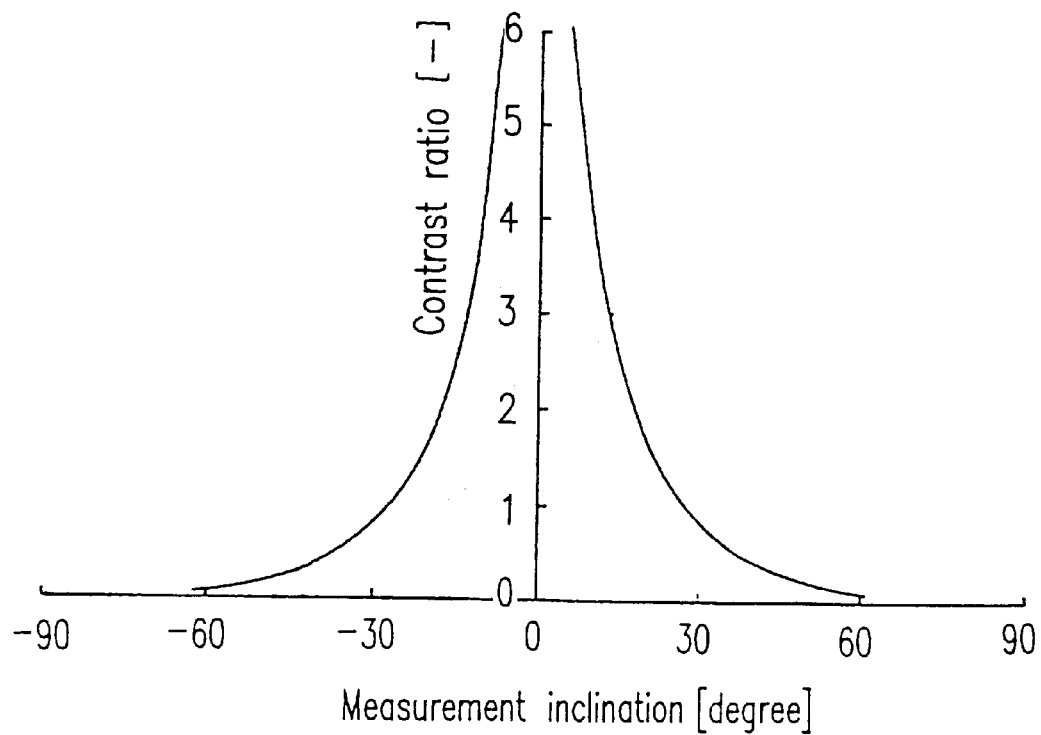
FIG. 15B is a graph showing the viewing angle dependency of the contrast ratio of a conventional reflective liquid crystal display device.

(*) Period of time before occurence of linear remaining images
X:Less than 200 hrs
○:200 ~ 500 hrs
⊚:More than 500 hrs Thus, the reflective liquid crystal display device is produced using the reflector produced according to the present invention and employing the GH type liquid crystal material, with the parameters thereof being optimized. FIGS. 14A and 15A show the viewing angle characteristic of the reflective liquid crystal display device of Example 6; and FIGS. 14B and 15B show viewing angle characteristic of a reflective liquid crystal display device incorporating a conventional reflector.

Referring to FIGS. 14A and 15A, the reflective liquid crystal display device of Example 6 performs desirable display with a contrast ratio of about 3.5 or higher and a brightness of about 40% or higher in a wide range of about −45° to +45° with respect to the regular reflection direction. On the other hand, as shown in FIGS. 14B and 15B, the liquid crystal display device incorporating the conventional reflector performs display with a contrast ratio of about 3.5 or higher and a brightness of about 40% or higher in a limited range of about −15° to +15° with respect to the regular reflection direction, but the brightness sharply drops outside this range.

Moreover, when viewed by human eyes under a plurality of light sources as described in Example 5, the reflective liquid crystal display device of Example 6 not only exhibits an extended viewing angle but also appears brighter.

Due to the reflector of the present invention and by incorporating it in a reflective liquid crystal display device in combination with a GH type liquid crystal material with the parameters thereof being optimized, display which is brighter than conventional devices with high contrast and no hysteresis is obtained. Thus, multi-gray-level display is realized. Therefore, it becomes possible to combine the liquid crystal display device with a color filter as will be described in Example 7. As a result, a multi-color reflective liquid crystal display device which can be practically used is realized.

(EXAMPLE 7)

In Example 7 of the present invention, the reflective liquid crystal display device of Example 6 which is adjusted to incorporate a color filter will be described.

Figure 19:
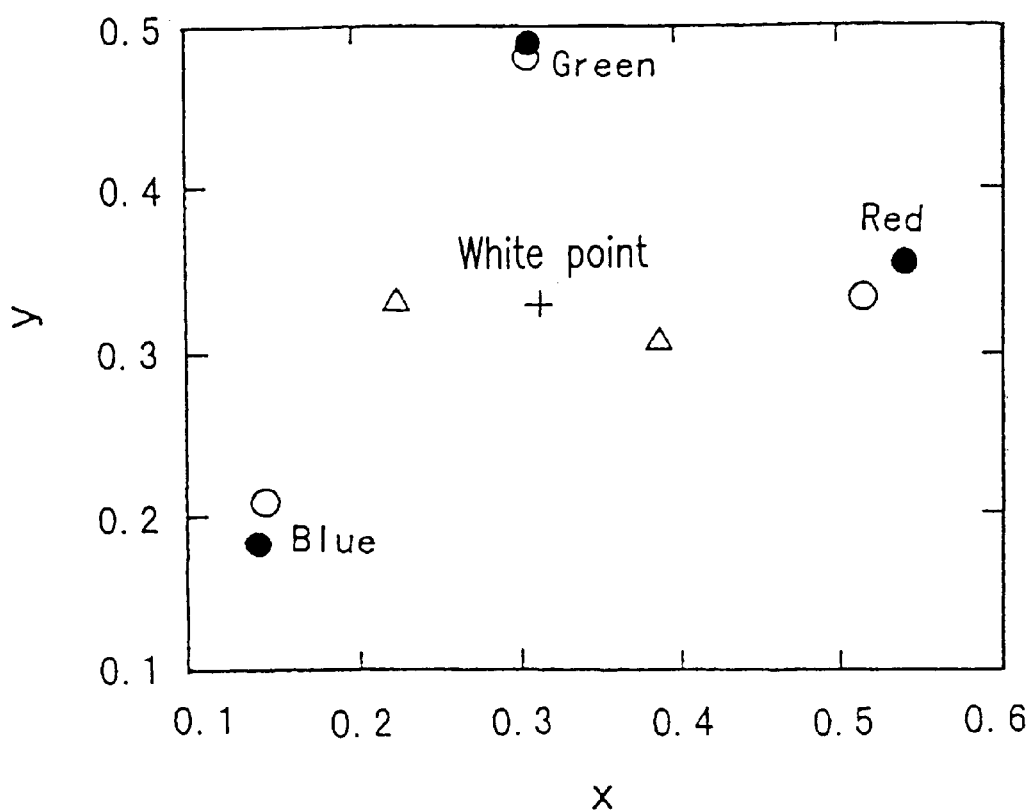
FIG. 19 is a chromaticity diagram of color filters incorporated in the reflective liquid crystal display device of the present invention and a color filter incorporated in conventional reflective liquid crystal display devices.
Figure 20A:
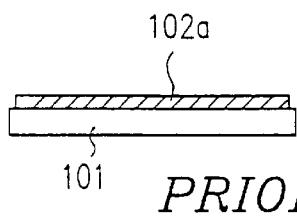
FIGS. 20A to 20L illustrate the fabrication process of a conventional reflector, where
Figure 20B:
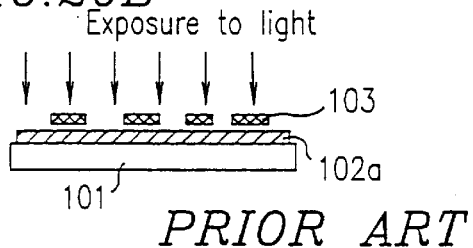
Figure 20C:
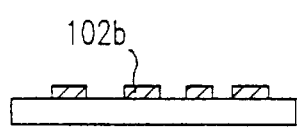
Figure 20D:
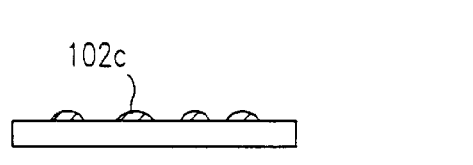
Figure 20E:
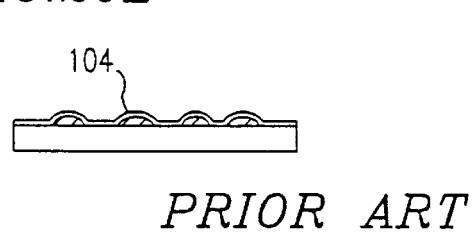
Figure 20F:
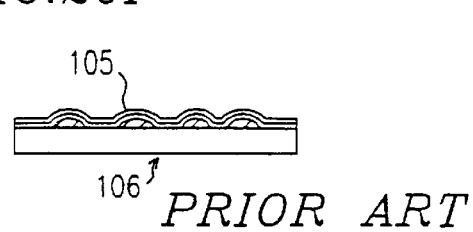
Figure 20G:
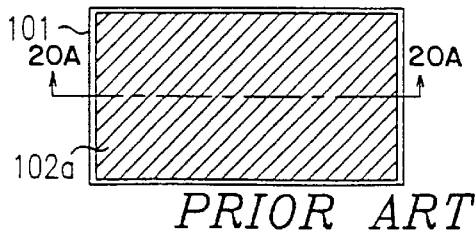
Figure 20H:
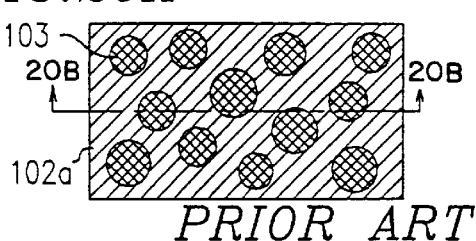
Figure 20I:
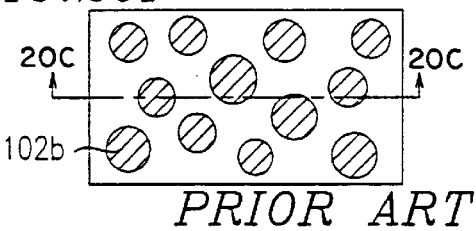
Figure 20J:
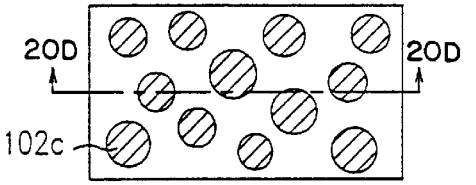
Figure 20K:
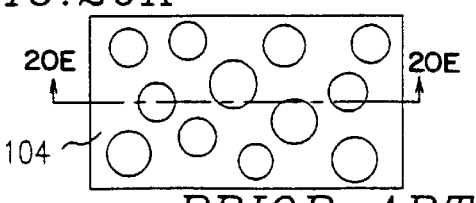
Figure 20L:

FIG. 19 shows a chromaticity diagram of color filters incorporated in the reflective liquid crystal display device of Example 7 and a color filter incorporated in a conventional reflective liquid crystal display device. In FIG. 19, the conventional color filter (represented by △) only exhibits dull colors and the number of colors is limited to two because the amount of transmitting light must be increased. The color filters (represented by ⚪ and ⬤) of Example 7 exhibit three colors (red, green, and blue) which are richer than those of the conventional color filter.

FIG. 13 shows a cross-sectional view of the color filter used in Example 7.

As shown in FIG. 13, the color filter has a maximum difference in thickness of about 0.6 μm between adjacent colored portions. When such a color filter is attached to a counter substrate, and a liquid crystal display device is produced using such a counter substrate without taking any special measures, stripe domains will be generated due to the difference in thickness between adjacent colored portions. In order to reduce this imperfection, a flattening film is provided over the color filter, thereby reducing the difference in thickness between adjacent colored portions to be about 0.3 μm. When a color filter has difference in thickness between adjacent colored portions less than 0.3 μm, the color filter may be used without a flattening film.

Thus, it is possible to realize a liquid crystal display device which can incorporate a color filter without any hysteresis. This makes it possible to realize a display with many gray-scale levels. Accordingly, the color reproduction of the liquid crystal display device is improved. The liquid crystal display device of the present example has shown to provide multicolor display with 256 or more colors at a low power consumption level, the display being excellent in brightness, contrast, response rate, reliability, etc.

As described above, according to the present invention, a reflector is provided with a substrate, a plurality of convex/concave portions formed on the substrate, and a thin reflective film formed over the convex/concave portions. When light is incident upon the reflector from a certain direction, an intensity of reflected light in a viewing angle range of about −45° to +45° with respect to a regular reflection direction of the incident light is about 60% or more of the reference intensity. Thus, a high intensity of reflected light can be obtained in a wider range as compared to the conventional reflector. Under ambient light, where light is incident upon the reflector from every directions, light can be directed by the reflector to a wider viewing angle. As a result, the total intensity of the reflected light is improved.

By forming each of the convex/concave portions at least partially to include a continuous curved surface, a total area of portions of the substrate whose inclination at a surface of the reflector is less than 2° accounts for about 40% or less with respect to a total area of the substrate. Thus, the amount of light which is reflected by the regular reflection can be relatively reduced with respect to the entire reflected light, thereby obtaining a high intensity of reflected light in a wide viewing angle. Moreover, under ambient light, where light is incident upon the reflector from every direction, light can be directed by the reflector to a wider viewing angle. As a result, the total intensity of the reflected light is improved.

The convex/concave portions may be formed of a photosensitive resin. Thus, desirable convex/concave portions can be formed by a photolithography process, not requiring a photosensitive resin for additional patterning process. Alternatively, the convex/concave portions may be formed of an inorganic oxide and a photosensitive resin. In this case, desirable convex/concave portions can be formed by a simple process. Alternatively, the convex/concave portions may be formed of minute particles and a photosensitive resin. In this case, desirable convex/concave portions can be formed by a simple process.

Moreover, according to the present invention, a reflector, which includes a substrate, a plurality of convex/concave portions formed on the substrate, and a thin reflective film formed over the convex/concave portions, is fabricated by the steps of: performing a photolithography process and a heat-treatment process to form the convex/concave portions for a plurality of rounds; and forming the thin reflective film over the convex/concave portions. Thus, it is possible to control the density of the convex/concave portions on the substrate. As a result, a reflector having a desirable reflection characteristic can be fabricated with high reproducibility.

By making a shape of the convex/concave portions formed through a single round of the photolithography process constant, a reflector having a desirable reflection characteristic can be fabricated with high reproducibility based on a simple design. In addition, by making a shape of the convex/concave portions formed in one round of the photolithography process different from a shape of the convex/concave portions formed in another round of the photolithography process, convex/concave portions of different shapes are formed on the substrate. Therefore, interference due to the convex/concave pattern does not occur, and coloring of reflected light can be suppressed.

Moreover, as a photosensitive resin used in the plurality of rounds of photolithography processes, a negative photosensitive resin is first used and a positive photosensitive resin is subsequently used. Thus, the shape of the convex/concave portions formed in a former step is kept unchanged.

Alternatively, a reflector, which includes a substrate, convex/concave portions formed on the substrate, and a thin reflective film formed over the convex/concave portions, is fabricated by the steps of: performing a photolithography process and a heat treatment to form the convex/concave portions; and forming the thin reflective film over the convex/concave portions. The method further includes the steps of: forming an oxide on the substrate; and etching the oxide. Thus, desirable convex/concave portions can be formed by a simple process.

Alternatively, a reflector which includes a substrate, convex/concave portions formed on the substrate, and a thin reflective film formed over the convex/concave portions, is fabricated by the steps of: performing a photolithography process and a heat treatment so as to form the convex/concave portions; and forming the thin reflective film over the convex/concave portions, wherein the method further comprises the step of applying an organic insulating resin mixed with minute particles onto the substrate. Thus, desirable convex/concave portions can be formed by a simple process.

Furthermore, by incorporating the reflector of the present invention into a reflective liquid crystal display device, it is possible to realize a display with high brightness and high contrast. In addition, the reflective liquid crystal display device may further include a layer of a guest-host type liquid crystal material interposed between the substrate and the reflector. In this case, it is possible to realize a display with higher brightness and high contrast.

In addition, a birefringence ($\Delta n$) of the liquid crystal material is about 0.15 or less; a dielectric constant anisotropy ($\Delta \epsilon$) of the liquid crystal material satisfies an expression: $4 < \Delta \epsilon < 12$; a twist angle of the liquid crystal material is set to be within a range of about 180° to 360°; and a thickness of a cell constituted by the substrate, the reflector and the liquid crystal layer is within a range of about 3 to 10 $\mu$m. Thus, it is possible to realize, at a low power consumption level, a reliable, bright, high-contrast, quick-response display which can perform display with many gray-scale levels.

Moreover, the reflective liquid crystal display device may further include a color filter including colored portions of three different colors, wherein a difference in thickness between adjacent colored portions is about 0.3 $\mu$m or less. Thus, it is possible to realize a multi-color display which can be practically used.

By using the reflector of the present invention, it is possible to utilize ambient light and to obtain a high intensity of reflected light in a wide viewing angle while suppressing the proportion of the amount of light reflected in the direction of the regular reflection with respect to the entire reflected light. Therefore, although the intensity of ambient light is relatively uniform in every directions, the liquid crystal display device incorporating the reflector of the present invention can achieve bright display under such ambient light. Moreover, in accordance with the fabrication method of the reflector of the present invention, the reflector as described above can be fabricated accurately to the design of the reflector with good reproducibility.

Furthermore, the reflective liquid crystal display device incorporating the reflector of the present invention allows ambient light to be more efficiently utilized than with a conventional technique, thereby realizing display with excellent contrast. Furthermore, by optimizing the characteristics of the liquid crystal layer, it is possible to provide a multi-gray-level reflective liquid crystal display device having excellent characteristics in brightness, contrast, response rate, reliability, power consumption, etc., and which does not generate any hysteresis. It is also possible, by incorporating a color filter in such a device, to realize a multi-color reflective liquid crystal display device which exhibits excellent colors.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A reflector comprising a substrate, a plurality of convex/concave portions formed on the substrate, and a thin reflective film formed over the convex/concave portions, wherein each of the convex/concave portions at least partially include a continuous curved surface; and a total area of the portions of the substrate whose inclination at a surface of the reflector is less than 2° accounts for about 40% or less with respect to a total area of the substrate.

2. A reflector according to claim 1, wherein the convex/concave portions are formed of a photosensitive resin.

3. A reflector according to claim 1, wherein the convex/concave portions are formed of an inorganic oxide and a photosensitive resin.

4. A reflector according to claim 1, wherein the convex/concave portions are formed of minute particles and a photosensitive resin.

5. A reflective liquid crystal display device comprising a reflector according to claim 1.

6. A reflective liquid crystal display device according to claim 5, further comprising a substrate and a liquid crystal layer interposed between the substrate and the reflector, wherein the liquid crystal layer includes a guest-host type liquid crystal material.

7. A reflective liquid crystal display device according to claim 6, wherein:

a birefringence ($\Delta n$) of the liquid crystal material is about 0.15 or less;

a dielectric constant anisotropy ($\Delta \epsilon$) of the liquid crystal material satisfies an expression: $4<\Delta\epsilon<12$;

a twist angle of the liquid crystal material is set to be within a range of about 180° to 360°; and a thickness of a cell constituted by the substrate, the reflector and the liquid crystal layer is within a range of about 3 to 10 $\mu$m.

8. A reflective liquid crystal display device according to claim 5, further comprising a color filter including colored portions of three different colors, wherein a difference in thickness between adjacent ones of the colored portions is about 0.3 $\mu$m or less.

9. A Reflector according to claim 1, wherein the convex/concave portions are formed by forming a plurality of cylindrical depressions in a photosensitive resin layer formed on the substrate and heating the plurality of cylindrical depressions.

10. The reflector of claim 1, wherein, when light is incident upon the reflector at a first incident angle with respect to a normal direction thereof, an intensity of the light which is reflected by the reflector toward a direction range of about $-45°$ to $+45°$ with respect to a regular reflection direction of the light is about 60% or more of a reference intensity, where the reference intensity is an intensity of light which is incident upon a standard white plate at a second incident angle with respect to a normal direction thereof and is reflected toward normal direction thereof, the first incident angle and the second incident angle being substantially equal to each other.

* * * * *